(12) United States Patent
Hakeem et al.

(10) Patent No.: US 10,947,932 B2
(45) Date of Patent: Mar. 16, 2021

(54) METHODS AND SYSTEMS FOR ADJUSTING A FLOW OF GASES IN A SCAVENGE EXHAUST GAS RECIRCULATION SYSTEM OF A SPLIT EXHAUST ENGINE SYSTEM

(71) Applicant: Ford Global Technologies, LLC, Dearborn, MI (US)

(72) Inventors: Mohannad Hakeem, Dearborn, MI (US); Timothy Joseph Clark, Livonia, MI (US); Gopichandra Surnilla, West Bloomfield, MI (US); Daniel Paul Madison, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/450,818

(22) Filed: Jun. 24, 2019

(65) Prior Publication Data
US 2020/0400106 A1 Dec. 24, 2020

(51) Int. Cl.
*F02M 26/14* (2016.01)
*F02M 26/08* (2016.01)
(Continued)

(52) U.S. Cl.
CPC ........... *F02M 26/14* (2016.02); *F01N 13/107* (2013.01); *F02D 13/0203* (2013.01);
(Continued)

(58) Field of Classification Search
CPC ........ F02M 26/14; F02M 26/08; F02M 26/42; F01N 13/107; F02D 13/0203; F02D 13/0261; F02D 13/0276
(Continued)

(56) References Cited

U.S. PATENT DOCUMENTS 6,499,469 B2 * 12/2002 Ogawa ................ F02D 13/0261
123/90.15
6,742,506 B1 6/2004 Grandin
(Continued)

FOREIGN PATENT DOCUMENTS

WO 2016128642 A1 8/2016

OTHER PUBLICATIONS

Surnilla, G. et al., "Method for Determining a Dilution of Recirculated Gases in a Split Exhaust Engine," U.S. Appl. No. 15/926,940, filed Mar. 20, 2018, 72 pages.
(Continued)

*Primary Examiner* — Thai Ba Trieu
(74) *Attorney, Agent, or Firm* — Geoffrey Brumbaugh; McCoy Russell LLP

(57) ABSTRACT

Methods and systems are provided for adjusting operation of a split exhaust engine system based on a total flow of gases through a scavenge exhaust gas recirculation system of the split exhaust engine system. In one example, a method may include setting a cam timing correction based on a difference between a first value and a second value of a flow through an exhaust gas recirculation (EGR) passage, the first value determined based on a first parameter set including a cylinder valve overlap area and the second value determined based on a second parameter set not including the cylinder valve overlap area, and operating at least one of an intake cam and an exhaust cam at a corrected timing using the cam timing correction. In this way, the flow through the EGR passage may be adjusted even without active control of a valve coupled in the EGR passage.

20 Claims, 6 Drawing Sheets

(51) Int. Cl.
*F02M 26/42* (2016.01)
*F01N 13/10* (2010.01)
*F02D 13/02* (2006.01)

(52) U.S. Cl.
CPC ..... *F02D 13/0261* (2013.01); *F02D 13/0276* (2013.01); *F02M 26/08* (2016.02); *F02M 26/42* (2016.02)

(58) Field of Classification Search
USPC ................. 60/605.2; 701/108; 123/90.15
See application file for complete search history.

(56) References Cited

U.S. PATENT DOCUMENTS

| | | | |
|---|---|---|---|
| 6,827,051 B2 | 12/2004 | Kawasaki et al. | |
| 6,840,235 B2 | 1/2005 | Koseki et al. | |
| 7,673,599 B2* | 3/2010 | Katsuma ................ | F02D 13/02 123/90.15 |
| 8,069,663 B2 | 12/2011 | Ulrey et al. | |
| 8,479,511 B2 | 7/2013 | Pursifull et al. | |
| 8,495,992 B2 | 7/2013 | Roth | |
| 8,511,084 B2 | 8/2013 | Ulrey et al. | |
| 8,539,770 B2 | 9/2013 | Williams | |
| 8,601,811 B2 | 12/2013 | Pursifull et al. | |
| 8,701,409 B2 | 4/2014 | Pursifull et al. | |
| 9,080,523 B1 | 7/2015 | Ulrey et al. | |
| 9,638,119 B2* | 5/2017 | Hagari ................ | F02D 41/0072 |
| 10,001,071 B2* | 6/2018 | Katsuura ............ | F02D 13/0265 |
| 10,012,159 B1 | 7/2018 | Ulrey et al. | |
| 10,018,123 B1 | 7/2018 | Ulrey et al. | |
| 10,024,255 B2 | 7/2018 | Ulrey et al. | |
| 10,060,371 B2 | 8/2018 | Ulrey | |
| 10,094,310 B2 | 10/2018 | Ulrey et al. | |
| 10,107,220 B2 | 10/2018 | Ulrey et al. | |
| 10,132,235 B2 | 11/2018 | Ulrey et al. | |
| 10,138,822 B2 | 11/2018 | Ulrey et al. | |
| 10,145,315 B2 | 12/2018 | Ulrey et al. | |
| 10,161,332 B2 | 12/2018 | Ulrey et al. | |
| 10,190,507 B2 | 1/2019 | Ulrey et al. | |
| 10,316,771 B2 | 6/2019 | Ulrey et al. | |
| 10,328,924 B2 | 6/2019 | Ulrey et al. | |
| 10,330,001 B2 | 6/2019 | Leone et al. | |
| 10,337,425 B2 | 7/2019 | Boyer et al. | |
| 10,393,039 B2 | 8/2019 | Ulrey et al. | |
| 10,393,041 B2 | 8/2019 | Ulrey et al. | |
| 2015/0316005 A1 | 11/2015 | Madison et al. | |
| 2016/0146137 A1* | 5/2016 | Hagari ................ | F02D 41/145 123/350 |
| 2018/0171845 A1 | 6/2018 | Veiga Pagliari et al. | |
| 2018/0171898 A1 | 6/2018 | Ulrey et al. | |
| 2018/0171913 A1 | 6/2018 | Ulrey et al. | |

OTHER PUBLICATIONS

Madison, D. et al., "Method for Determining a Dilution of Recirculated Gases in a Split Exhaust Engine," U.S. Appl. No. 15/926,970, filed Mar. 20, 2018, 75 pages.

Hakeem, M. et al., "Methods and Systems for Estimating a Flow of Gases in a Scavenge Exhaust Gas Recirculation System of a Split Exhaust Engine System," U.S. Appl. No. 16/435,374, filed Jun. 7, 2019, 68 pages.

* cited by examiner

METHODS AND SYSTEMS FOR ADJUSTING A FLOW OF GASES IN A SCAVENGE EXHAUST GAS RECIRCULATION SYSTEM OF A SPLIT EXHAUST ENGINE SYSTEM

FIELD

The present description relates generally to methods and systems for an engine having a split exhaust system.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that a split exhaust system, where a first exhaust manifold routes exhaust to a turbine of the turbocharger in an exhaust of the engine and a second exhaust manifold routes exhaust gas recirculation (EGR) to an intake of the engine, upstream of a compressor of the turbocharger, may decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold via a first set of exhaust ports, and a second set of cylinder exhaust valves (e.g., scavenge exhaust valves) are exclusively coupled to the second exhaust manifold via a second set of exhaust ports. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while increasing a work efficiency of the turbine and increasing engine torque.

However, the inventors herein have recognized potential issues with such systems. As one example, in the engine system described above, a rate (or amount) of EGR supplied via the second exhaust manifold may be affected by cylinder valve cam timing. For example, an EGR valve coupled in the EGR passage may be an on/off valve, and there may be no active control of the EGR rate (e.g., by varying a degree of opening of the EGR valve). Instead, a valve overlap duration between the cylinder intake valves and the second set of cylinder exhaust valves as well as a valve overlap position (with respect to top dead center of the intake stroke) may determine the EGR rate. Thus, cam timing errors may result in more or less EGR than expected, which may in turn result in less than optimal engine performance (e.g., an interruption in power delivery), decreased fuel economy, and/or an increased occurrence of knock.

In one example, the issues described above may be addressed by a method comprising: setting a cam timing correction based on a difference between a first determination and a second determination of a flow through an exhaust gas recirculation (EGR) passage, the first determination based on a cylinder valve overlap and the second determination independent of the cylinder valve overlap; and operating at least one of an intake cam and an exhaust cam at a corrected timing using the cam timing correction. In this way, the flow through the EGR passage may be adjusted even when a valve coupled in the EGR passage is an on/off valve.

As one example, the EGR passage may be a scavenge EGR (e.g., SC-EGR) passage coupling a scavenge exhaust manifold to an intake passage of the engine, and the scavenge exhaust manifold may be coupled to each cylinder of the engine via a scavenge exhaust valve that is controlled by the exhaust cam. The intake passage of the engine may be coupled to each cylinder of the engine via an intake manifold and at least one intake valve may be controlled by the intake cam. In such an example, the cylinder valve overlap may be an opening overlap area between the scavenge exhaust valve and the intake valve, the opening overlap area creating a variable orifice through the corresponding cylinder between the intake manifold and the scavenge exhaust manifold. The first determination may be further based on pressures in each of the intake manifold and the scavenge exhaust manifold such that the first determination may be a modeled flow value determined via a variable orifice equation. The second determination may be based on pressures in each of the EGR passage and the intake passage, upstream of a junction between the EGR passage and the intake passage, such that the second determination may be an estimated flow value determined based on a pressure difference between the EGR passage and the intake passage.

A controller may directly compare the first determination with the second determination to determine the cam timing correction. For example, the first determination and the second determination may be time- and crank angle-aligned values, and the controller may determine whether the second determination is different than the first determination. The second determination may be considered different than the first determination in response to the second determination being at least a threshold amount greater than or less than the first determination. In response to the second determination being different than the first determination, the controller may infer that a cam timing error has resulted in more or less flow through the SC-EGR passage than expected (e.g., modeled using the variable orifice equation) and may set the cam timing correction accordingly. For example, in response to the second determination being at least the threshold amount greater than the first determination, the controller may set the cam timing correction to decrease the opening overlap area between the scavenge exhaust valve and the intake valve to decrease the flow through the SC-EGR passage, resulting in the second determination decreasing to the first determination. As another example, in response to the second determination being at least the threshold amount less than the first determination, the controller may set the cam timing correction to increase the opening overlap area between the scavenge exhaust valve and the intake valve to increase the flow through the SC-EGR passage, resulting in the second determination increasing to the first determination. Thus, by comparing the second determination to the first determination, the controller may identify cam timing errors that result in more or less EGR than expected and correct these errors via the cam timing correction in order to provide the expected flow through the EGR passage, resulting in increased engine performance, increased fuel economy, and a reduced occurrence of knock.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
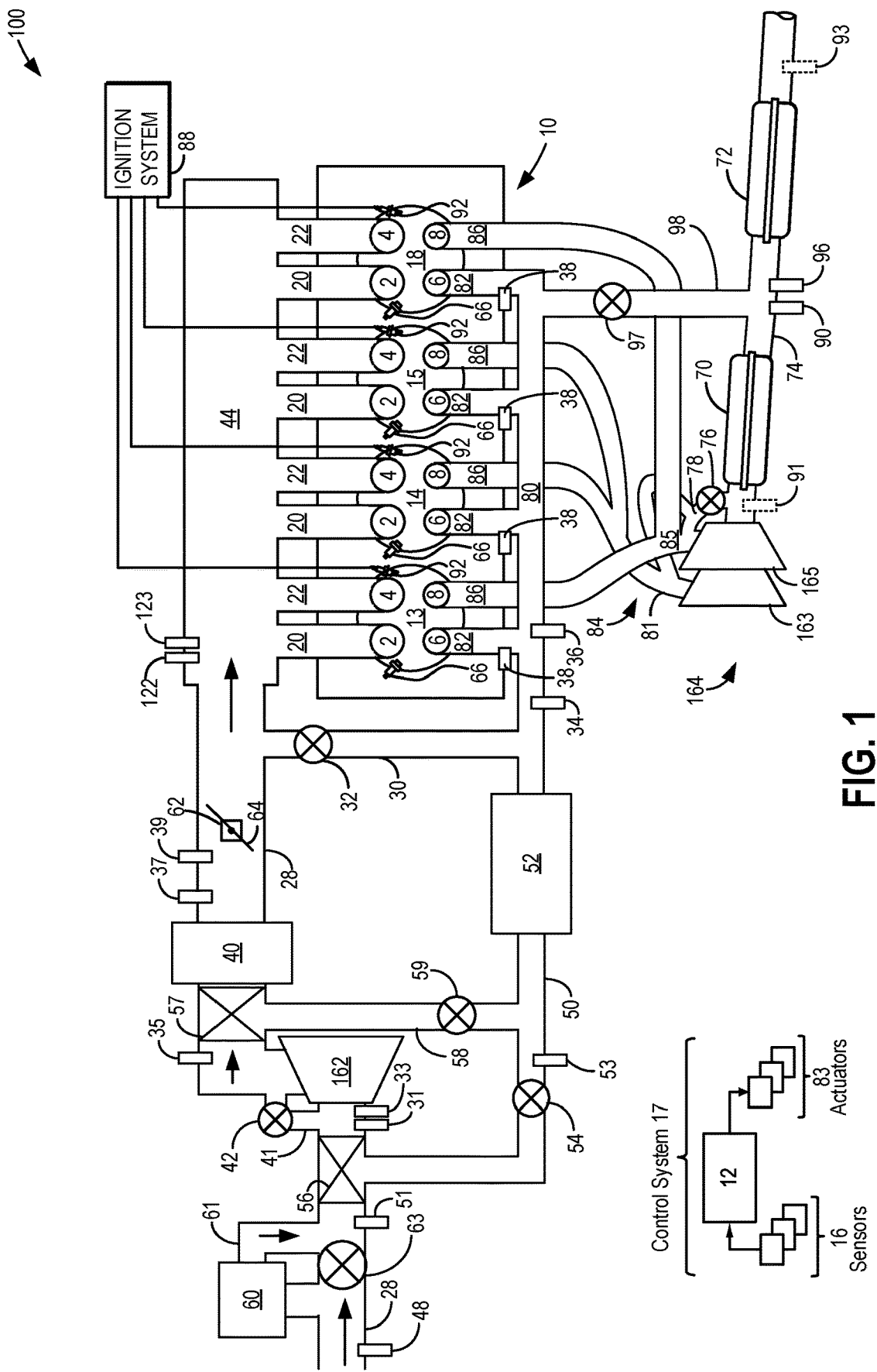
FIG. 1 shows a schematic depiction of a turbocharged engine system with a split exhaust system.

The following description relates to systems and methods for operating a split exhaust engine while providing blow-through and exhaust gas recirc4ulation (EGR) to an engine intake and adjusting engine operation based on a determined flow of gases recirculated to the engine intake versus a modeled (e.g., predicted) flow of the gases. An example of the split exhaust engine, which includes a scavenge EGR system, is shown in FIG. 1. For example, the scavenge EGR system may include a dedicated scavenge exhaust manifold that is coupled to a scavenge exhaust valve (e.g., a second exhaust valve) of each cylinder and coupled to the engine intake via a scavenge EGR passage. In one example, the engine may be installed in a hybrid vehicle system, such as the vehicle system of FIG. 2. As shown in the cylinder valve timing diagram of FIG. 3, a valve overlap period occurs between the scavenge exhaust valve and intake valves of each cylinder, during which the scavenge exhaust valve and the intake valves are open at the same time. During this valve overlap period, gas may enter the scavenge exhaust manifold (and thus be recirculated to the intake passage). The gas may contain different concentrations of burnt gases, fresh air, and unburnt fuel that together comprise a total bulk flow. The valve overlap period may vary in duration and area based on valve timings, as shown by FIGS. 4A and 4B, which results in the total bulk flow varying in amount (or flow rate). The total bulk flow recirculated to the intake passage from the scavenge manifold via the scavenge EGR passage may be modeled based on the valve overlap period between the scavenge exhaust valve and intake valves and pressures in an intake manifold and the scavenge exhaust manifold (e.g., as a first determination of the flow), and the modeled flow may be compared to an estimated flow, determined based on delta pressure measurements (e.g., a second determination of the flow), in order to determine a cam adaptive term (e.g., a cam timing correction), such as according to the method of FIG. 5. For example, when the second determination is greater than the first determination, the valve overlap period may be greater than expected, and so the cam adaptive term may decrease the valve overlap period to decrease the flow through the scavenge EGR passage. Conversely, when the second determination is less than the first determination flow, the valve overlap period may be less than expected, and so the cam adaptive term may increase the valve overlap period to increase the flow through the scavenge EGR passage. FIG. 6 shows a prophetic example timeline for operating with the cam adaptive term responsive to the estimated flow being greater than or less than the modeled flow. In this way, a total bulk scavenge EGR flow may be accurately provided even without active EGR valve control. As a result, engine efficiency may be increased.

Turning now to the figures, FIG. 1 shows a schematic diagram of an engine system including a multi-cylinder internal combustion engine 10, which may be included in a propulsion system of a vehicle 100. Engine 10 includes a plurality of combustion chambers (e.g., cylinders), which may be capped on the top by a cylinder head. In the example shown in FIG. 1, engine 10 includes cylinders 13, 14, 15, and 18, arranged in an inline-4 configuration. Cylinders 14 and 15 are referred to herein as the inner (or inside) cylinders, and cylinders 13 and 18 are referred to herein as the outer (or outside) cylinders. However, it should be understood that although FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as will be further described below.

Each of cylinders 13, 14, 15, and 18 includes two intake valves, including a first intake valve 2 and a second intake valve 4, and two exhaust valves, including a first exhaust valve 8 and a second exhaust valve 6. First exhaust valve 8 may also be referred to herein as a blowdown exhaust valve (or blowdown valve, BDV), and second exhaust valve 6 may also be referred to herein as a scavenge exhaust valve (or scavenge valve, SV). The intake valves and exhaust valves may be referred to herein as cylinder intake valves and cylinder exhaust valves, respectively. As explained below with reference to FIG. 2, a timing (e.g., opening timing, closing timing, opening duration, etc.) of each of the intake valves may be controlled via various camshaft timing systems. In one example, both of the first intake valves 2 and the second intake valves 4 may be controlled to a same valve timing, such that they open and close at the same time in the engine cycle. In an alternative example, the first intake valves 2 and the second intake valves 4 may be controlled at a different valve timing. Further, the first exhaust valves 8 may be controlled at a different valve timing than the second exhaust valves 6, such that the first exhaust valve and the second exhaust valve of a same cylinder open and close at different times than one another and the intake valves, as further discussed below.

Each cylinder receives intake air (or a mixture of intake air and recirculated exhaust gas, as will be elaborated below) from an intake manifold 44 via an air intake passage 28. Intake manifold 44 is coupled to the cylinders via intake ports (e.g., runners). For example, intake manifold 44 is shown coupled to each first intake valve 2 of each cylinder via a first intake port 20. Further, intake manifold 44 is coupled to each second intake valve 4 of each cylinder via a second intake port 22. In this way, each cylinder intake port can selectively communicate with the cylinder it is coupled to via a corresponding one of the first intake valves 2 or second intake valves 4. Each intake port may supply air, recirculated exhaust gas, and/or fuel to the cylinder it is coupled to for combustion.

As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air. The valve opening overlap period will be further described below with particular reference to FIG. 3 and FIGS. 4A and 4B.

A high pressure, dual stage fuel system (such as the fuel system shown in FIG. 2) may be used to generate fuel pressures at a fuel injector 66 coupled to each cylinder. As such, fuel may be directly injected into the cylinders via fuel injectors 66. A distributorless ignition system 88 provides an ignition spark to cylinders 13, 14, 15, and 18 via spark plugs 92 in response to a signal from controller 12 to initiate combustion.

Cylinders 13, 14, 15, and 18 are each coupled to two exhaust ports for channeling blowdown and scavenging portions of the combustion gases separately via a split exhaust system. Specifically, as shown in FIG. 1, the inside cylinders 14 and 15 exhaust a first, blowdown portion of the combustion gases to a first manifold portion 81 of a first exhaust manifold (also referred to herein as a blowdown exhaust manifold or blowdown manifold) 84 via first exhaust ports (e.g., runners) 86 and a second, scavenging portion of the combustion gases to a second exhaust manifold (also referred to herein as a scavenge exhaust manifold or scavenge manifold) 80 via second exhaust ports (e.g., runners) 82. The outside cylinders 13 and 18 exhaust the first, blowdown portion of the combustion gases to a second manifold portion 85 of first exhaust manifold 84 via first exhaust ports 86 and the second, scavenging portion to second exhaust manifold 80 via second exhaust ports 82. That is, first exhaust ports 86 of cylinders 13 and 18 extend from cylinders 13 and 18 to the second manifold portion 85 of first exhaust manifold 84, whereas first exhaust ports 86 of cylinders 14 and 15 extend from cylinders 14 and 15 to the first manifold portion 81 of first exhaust manifold 84. Second exhaust ports 82 extend from each of cylinders 13, 14, 15, and 18 to second exhaust manifold 80.

Each exhaust port can selectively communicate with the cylinder it is coupled to via the corresponding exhaust valve. For example, second exhaust ports 82 communicate with their respective cylinders via second exhaust valves 6, and first exhaust ports 86 communicate with their respective cylinders via first exhaust valves 8. Second exhaust ports 82 are isolated from first exhaust ports 86 when at least one exhaust valve of each cylinder is in a closed position. Exhaust gases may not flow directly between second exhaust ports 82 and first exhaust ports 86. The exhaust system described above may be referred to herein as a split exhaust system, where the first portion of exhaust gases from each cylinder are output to first exhaust manifold 84 and the second portion of exhaust gases from each cylinder are output to second exhaust manifold 80, and where the first and second exhaust manifolds do not directly communicate with one another. For example, no passage directly couples the two exhaust manifolds to one another, and thus the first and second portions of exhaust gases do not mix with one another within the first and second exhaust manifolds.

Engine 10 includes a turbocharger including a dual-stage exhaust turbine 164 and an intake compressor 162 coupled on a common shaft (not shown). Dual-stage turbine 164 includes a first turbine 163 and a second turbine 165. First turbine 163 is directly coupled to first manifold portion 81 of first exhaust manifold 84 and receives exhaust gases from cylinders 14 and 15 via first exhaust valves 8 of cylinders 14 and 15. Second turbine 165 is directly coupled to second manifold portion 85 of first exhaust manifold 84 and receives exhaust gases from cylinders 13 and 18 via first exhaust valves 8 of cylinders 13 and 18. Rotation of the first and second turbines drives rotation of compressor 162, disposed within intake passage 28. As such, the intake air becomes boosted (e.g., pressurized) at the compressor 162 and travels downstream to intake manifold 44.

Exhaust gases exit both first turbine 163 and second turbine 165 into a common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve 76 controls an amount of boost provided by the turbocharger. For example, as an opening of wastegate valve 76 increases, an amount of exhaust gas flowing through bypass 78 and not through dual-stage turbine 164 may increase, thereby decreasing an amount of power available for driving dual-stage turbine 164 and compressor 162. As another example, as the opening of wastegate valve 76 decreases, the amount of exhaust gas flowing through bypass 78 decreases, thereby increasing the amount of power available for driving dual-stage turbine 164 and compressor 162. In alternative examples, engine 10 may include a single stage turbine where all exhaust gases from the first exhaust manifold 84 are directed to an inlet of a same turbine.

After exiting dual-stage turbine 164, exhaust gases flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way catalysts. In other examples, emission control devices 70 and 72 may include one or more of a diesel oxidation catalyst (DOC) and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12, which is included in a control system 17, as will be further described below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as a second oxygen sensor 91 positioned between dual-stage turbine 164 and first emission control device 70 and/or a third oxygen sensor 93 positioned downstream of second emission control device 72. As such, second oxygen sensor 91 may be configured to measure the oxygen content of the exhaust gas entering first emission control device 70, and third oxygen sensor 93 may be configured to measure the oxygen content of exhaust gas exiting second emission control device 72. In one example, one or more of oxygen sensor 90, oxygen sensor 91, and oxygen sensor 93 may be universal exhaust gas oxygen (UEGO) sensors. Alternatively, a two-state exhaust gas oxygen sensor may be substituted for one or more of oxygen sensors 90, 91, and 93. Exhaust passage 74 may include various other sensors, such as one or more temperature and/or pressure sensors. For example, as shown in FIG. 1, a sensor 96 is positioned within exhaust passage 74 between first emission control device 70 and second emission control device 72. Sensor 96 may be a pressure and/or temperature sensor. As such, sensor 96 may be configured to measure the pressure and/or temperature of exhaust gas entering second emission control device 72.

Both sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as a scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is also directly coupled to intake passage 28 at a junction upstream of compressor 162 (and thus, first EGR passage 50 may be referred to as a low-pressure EGR passage) such that second exhaust manifold 80 may be fluidically coupled to intake passage 28 upstream of compressor 162 via first EGR passage 50. For example, gases (including exhaust gases, blowthrough air, and unburnt fuel, as explained further below) may be directed from second exhaust manifold 80 to intake passage 28, upstream of compressor 162, via first EGR passage 50. As shown in FIG. 1, first EGR passage 50 may include an EGR cooler 52 configured to cool exhaust gases flowing from second exhaust manifold 80 to intake passage 28 and may further include a first EGR valve 54 (which may be referred to herein as a BTCC valve) disposed therein. Controller 12 is configured to actuate and adjust a position of BTCC valve 54 in order to control a flow rate and/or amount through first EGR passage 50. When the BTCC valve 54 is in a closed (e.g., fully closed) position, no exhaust gases or intake air may flow from second exhaust manifold 80 to intake passage 28, upstream of compressor 162. Further, when the BTCC valve 54 is in an open position (e.g., from partially open to fully open), exhaust gases and/or blowthrough air may flow from second exhaust manifold 80 to intake passage 28, upstream of compressor 162. In some examples, controller 12 may adjust the BTCC valve 54 into a plurality of positions between fully open and fully closed. In other examples, controller 12 may only adjust BTCC valve 54 to be either fully open or fully closed. Further, a pressure sensor 53 may be arranged in EGR passage 50 upstream of BTCC valve 54.

A first ejector 56 is positioned at an outlet of EGR passage 50, within intake passage 28. First ejector 56 may include a constriction or venturi that provides a pressure increase at the inlet of compressor 162. As a result, EGR from first EGR passage 50 may be mixed with fresh air flowing through intake passage 28 to compressor 162. Thus, EGR from first EGR passage 50 may act as the motive flow on first ejector 56. In an alternative example, there may not be an ejector positioned at the outlet of first EGR passage 50. Instead, an outlet of compressor 162 may be shaped as an ejector that lowers the gas pressure to assist in EGR flow (and thus, in this example, air is the motive flow and EGR is the secondary flow). In yet another example, EGR from first EGR passage 50 may be introduced at a trailing edge of a blade of compressor 162.

An intake pressure sensor 51 may be arranged immediately upstream of the venturi of first ejector 56. In one example, pressure sensor 51 and pressure sensor 53 may be included in a delta pressure measurement system, such as a delta pressure feedback of EGR (DPFE) system, for determining a delta (e.g., differential) pressure across the venturi of first ejector 56 and BTCC valve 54. For example, pressure sensor 51 may output a first pressure measurement (P1) to controller 12 indicative of an intake pressure upstream of the venturi of first ejector 56, and pressure sensor 53 may output a second pressure measurement (P2) to controller 12 indicative of a pressure in first EGR passage 50 upstream of BTCC valve 54. As will be further described below with respect to FIG. 5, controller 12 may determine the delta pressure (dP) from the first pressure measurement and the second pressure measurement and may further determine a flow rate through first EGR passage 50 based on the determined dP. In an alternative example, pressure sensor 53 may be located downstream of BTCC valve 54. In still another example, a single dP sensor may be included in first EGR passage 50 upstream or downstream of BTCC valve 54. For example, the single dP sensor may include a metered (e.g., restrictive) orifice and a pressure-sensitive disc between ports coupled upstream and downstream of the orifice. In such an example, movement of the pressure-sensitive disc may generate a voltage proportional to the delta pressure across the orifice, and the dP sensor may output a single signal to controller 12 indicative of the delta pressure.

A second EGR passage 58 is coupled between first EGR passage 50 and intake passage 28. Specifically, as shown in FIG. 1, second EGR passage 58 is coupled to first EGR passage 50 between BTCC valve 54 and EGR cooler 52. In other examples, when second EGR passage 58 is included in the engine system, the system may not include EGR cooler 52. Additionally, second EGR passage 58 is directly coupled to intake passage 28, downstream of compressor 162. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and EGR) as it passes through CAC 40. As such, recirculated exhaust gases from first EGR passage 50 and/or second EGR passage 58 may be cooled via CAC 40 before entering intake manifold 44. In an alternative example, second EGR passage 58 may be coupled to intake passage 28 downstream of CAC 40. Further, as shown in FIG. 1, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., blowthrough air and/or exhaust) through second EGR passage 58.

As further described below, controller 12 may actuate EGR valve 59 into an open (e.g., fully open) position (allowing minimally restricted flow thorough second EGR passage 58), a closed (e.g., fully closed) position (blocking flow through second EGR passage 58), or plurality of positions between fully open and fully closed based on (e.g., as a function of) engine operating conditions. For example, actuating EGR valve 59 may include controller 12 sending an electronic signal to an actuator of EGR valve 59 to move a valve plate of EGR valve 59 into the open position, the closed position, or some position between fully open and fully closed. Based on system pressures and positons of various other valves in the engine system, air may either flow toward intake passage 28 within second EGR passage 58 or toward second exhaust manifold 80 within second EGR passage 58.

Intake passage 28 further includes an intake throttle 62. As shown in FIG. 1, intake throttle 62 is positioned downstream of CAC 40. A position of a throttle plate 64 of throttle 62 may be adjusted by controller 12 via a throttle actuator (not shown) communicatively coupled to controller 12. By modulating intake throttle 62 while operating compressor 162, a desired amount of fresh air and/or recirculated exhaust gas may be cooled by CAC 40 and delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80, and a second end of third flow passage 30 is directly coupled to intake passage 28, downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, a fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38 and/or oxygen sensor 36.

In some examples, as shown in FIG. 1, intake passage 28 may include an electric compressor 60. Electric compressor 60 is disposed in a bypass passage 61, which is coupled to intake passage 28 upstream and downstream of an electric compressor valve 63. Specifically, an inlet to bypass passage 61 is coupled to intake passage 28 upstream of electric compressor valve 63, and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of electric compressor valve 63 in intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62. In some examples, as shown in FIG. 1, an additional intake oxygen sensor 39 may be positioned in intake passage 28 between CAC 40 and throttle 62. Further, an intake manifold pressure (e.g., MAP) sensor 122 and an intake manifold temperature sensor 123 are positioned within intake manifold 44, upstream of the engine cylinders.

Figure 2:
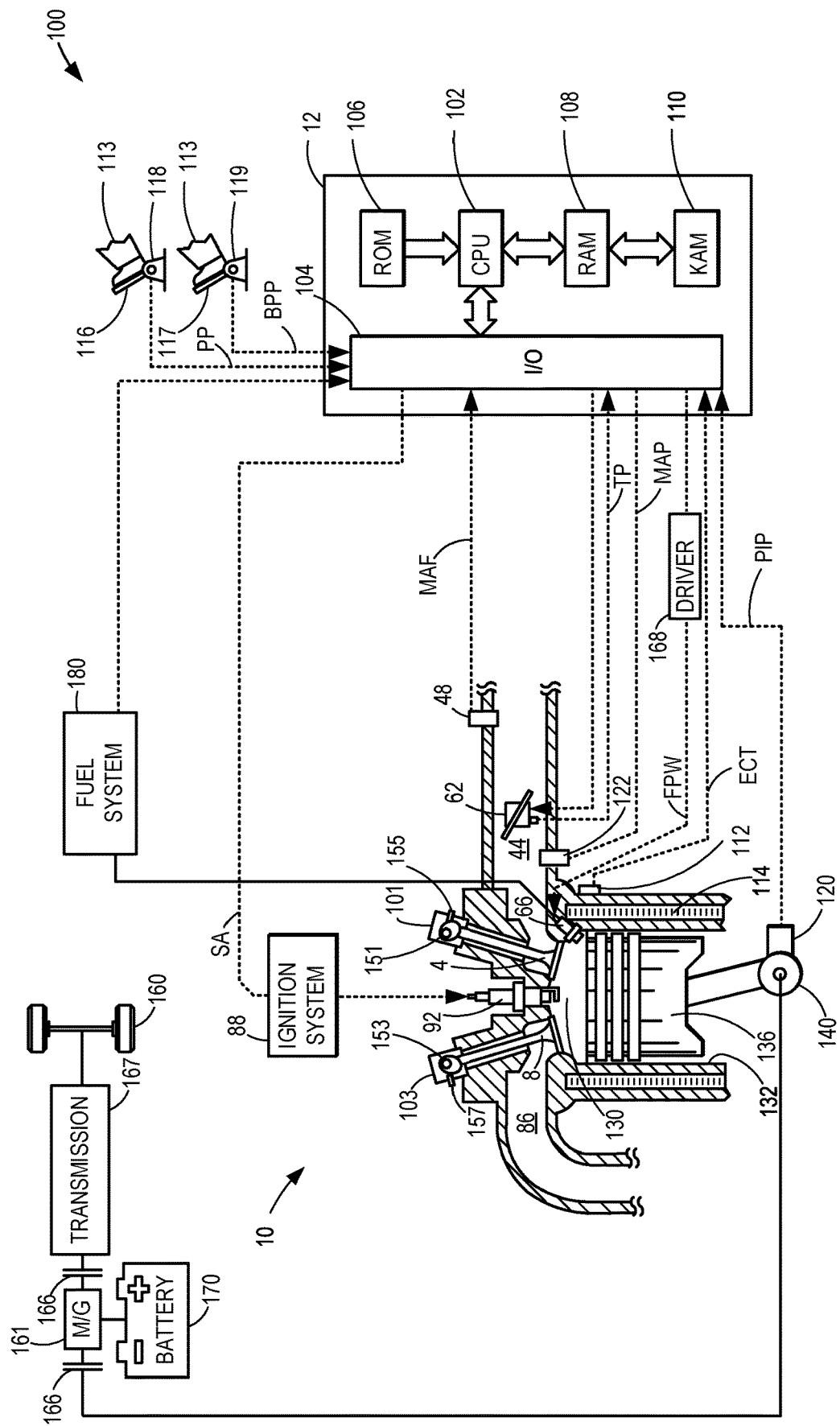
FIG. 2 shows an embodiment of a cylinder of the engine system of FIG. 1.

In some examples, engine 10 may be coupled to an electric motor/battery system (as shown in FIG. 2) in a hybrid vehicle. The hybrid vehicle may have a parallel configuration, a series configuration, or variations or combinations thereof. Further, in some examples, other engine configurations may be employed, for example a diesel engine.

Engine 10 may be controlled at least partially by control system 17, including controller 12, and by input from a vehicle operator via an input device (not shown in FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and second exhaust manifold 80 described above. Other sensors may include a throttle inlet temperature sensor for estimating a throttle air temperature (TCT) coupled upstream of throttle 62 in the intake passage. Additional system sensors and actuators are elaborated below with reference to FIG. 2. As another example, actuators 83 may include fuel injectors 66, valves 63, 42, 54, 59, 32, 97, 76, and throttle 62. Actuators 83 may further include various camshaft timing actuators coupled to the cylinder intake and exhaust valves (as described below with reference to FIG. 2). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5. For example, a total flow through first EGR passage 50, which may be referred to herein as a scavenge EGR passage, may be determined based on the valve overlap between the scavenge valve and intake valves, the valve overlap determined based on intake and exhaust cam timings. The controller may also measure the total flow through first EGR passage 50 and adjust an engine operating parameter, such by setting a corrective term for exhaust and/or intake cam timings, based on the estimated total flow relative to the determined total flow.

It should be noted that while FIG. 1 shows engine 10 including each of first EGR passage 50, second EGR passage 58, flow passage 98, and flow passage 30, in other examples, engine 10 may only include a portion of these passages. For example, engine 10 may only include first EGR passage 50 and flow passage 98 and not include second EGR passage 58 and flow passage 30. In another example, engine 10 may include first EGR passage 50, second EGR passage 58, and flow passage 98, but not include flow passage 30. In yet another example, engine 10 may include first EGR passage 50, flow passage 30, and flow passage 98, but not second EGR passage 58. In some examples, engine 10 may not include electric compressor 60. In still other examples, engine 10 may include all or only a portion of the sensors shown in FIG. 1.

Referring now to FIG. 2, a partial view of a single cylinder of internal combustion engine 10 is shown. As such, components previously introduced in FIG. 1 are represented with the same reference numbers and are not re-introduced. Engine 10 is depicted with a combustion chamber (e.g., cylinder) 130, which may represent any of cylinders 13, 14, 15, and 18 of FIG. 1. Combustion chamber 130 includes a coolant sleeve 114 and cylinder walls 132, with a piston 136 positioned therein and connected to a crankshaft 140. Combustion chamber 130 is shown communicating with intake manifold 44 and first exhaust port 86 via intake valve 4 and first exhaust valve 8, respectively. As previously described in FIG. 1, each cylinder of engine 10 may exhaust combustion products along two conduits, and only the first exhaust port (e.g., runner) leading from the cylinder to the turbine is shown in FIG. 2, while the second exhaust port (e.g., second exhaust port 82) is not visible in this view.

As also previously elaborated in FIG. 1, each cylinder of engine 10 may include two intake valves and two exhaust valves. In the depicted view, only one intake valve (e.g., intake valve 4) and first exhaust valve 8 are shown. Intake valve 4 and first exhaust valve 8 are located at an upper region of combustion chamber 130. Intake valve 4 and first exhaust valve 8 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve, including intake valve 4, is controlled by an intake cam (or camshaft) 151, and each exhaust valve, including first exhaust valve 8, is controlled by an exhaust cam (or camshaft) 153. The intake cam 151 may be actuated via an intake valve timing actuator 101 and the exhaust cam 153 may be actuated via an exhaust valve timing actuator 103 according to set (e.g., scheduled) intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the first exhaust valve 8 such that it remains closed and does not open at its set timing. The position of intake cam 151 and exhaust cam 153 may be determined by camshaft position sensors 155 and 157, respectively. As introduced above, in one example, all exhaust valves of every cylinder may be controlled on a same exhaust camshaft. As such, a timing of both of the scavenge (second) exhaust valve and the blowdown (first) exhaust valve may be adjusted together via one camshaft, but they may each have different timings relative to one another. In another example, the blowdown exhaust valve of every cylinder may be controlled via a first exhaust camshaft, and a scavenge exhaust valve of every cylinder may be controlled via a different, second exhaust camshaft. In this way, the valve timing of the scavenge valves and blowdown valves may be adjusted separately from one another. In alternative examples, the cam or valve timing system(s) of the scavenge and/or blowdown exhaust valves may employ a cam in cam system, an electrohydraulic-type system on the scavenge valves, and/or an electro-mechanical valve lift control on the scavenge valves.

In some examples, the intake and/or exhaust valves may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at lower cylinder pressures from exhaust gases exhausted at higher cylinder pressures. For example, a first exhaust cam profile can open the first exhaust valve (e.g., blowdown valve) from a closed positon just before bottom dead center (BDC) of the power stroke of combustion chamber 130 and close the same exhaust valve well before top dead center (TDC) of the exhaust stroke to selectively exhaust blowdown gases from the combustion chamber. Further, a second exhaust cam profile can be used to open the second exhaust valve (e.g., scavenge valve) from a closed position before a mid-point of the exhaust stroke and close it after TDC to selectively exhaust the scavenging portion of the exhaust gases. Example valve timings will be described below with respect to FIG. 3.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine (e.g., dual-stage turbine 164 introduced in FIG. 1) and a higher pressure exhaust passage and flowing a later, second portion of the exhaust gas (e.g., lower pressure exhaust) and blowthrough air to the compressor inlet (e.g., an inlet of compressor 162 introduced in FIG. 1), the engine system efficiency may be increased.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 92 for initiating combustion. Ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 130. While FIG. 2 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10 in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from MAP sensor 122. An engine speed signal, RPM, may be generated by controller 12 from signal PIP. The manifold pressure signal MAP from the manifold pressure sensor may be used to provide an indication of vacuum or pressure in the intake manifold.

In some examples, the vehicle may be a hybrid vehicle with multiple sources of torque available to one or more vehicle wheels 160. In other examples, the vehicle is a conventional vehicle with only an engine. In the example shown in FIG. 2, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Figure 3:
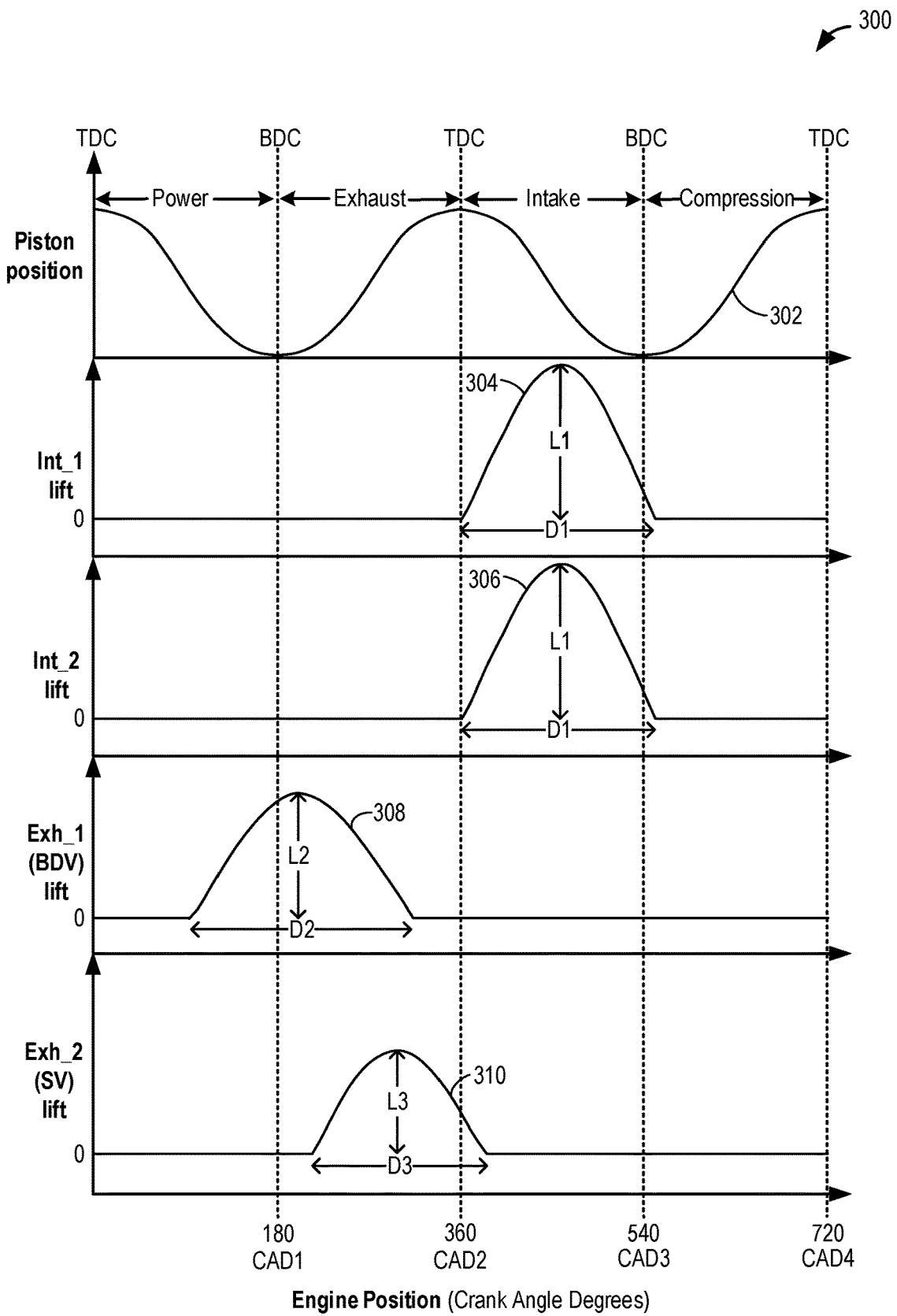
FIG. 3 shows example cylinder intake valve and exhaust valve timings for one engine cylinder of a split exhaust engine system.
Figure 4B:
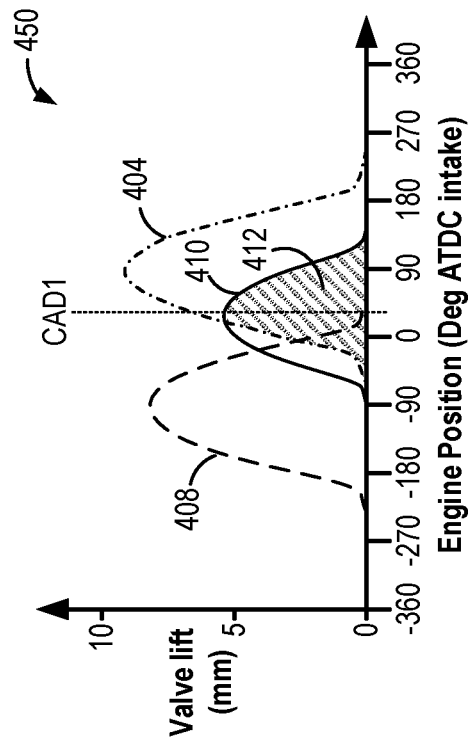
FIGS. 4A-4B schematically illustrate sources of different recirculated gases throughout an open duration of the scavenge exhaust valve with respect to example engine positions.
Figure 4A:
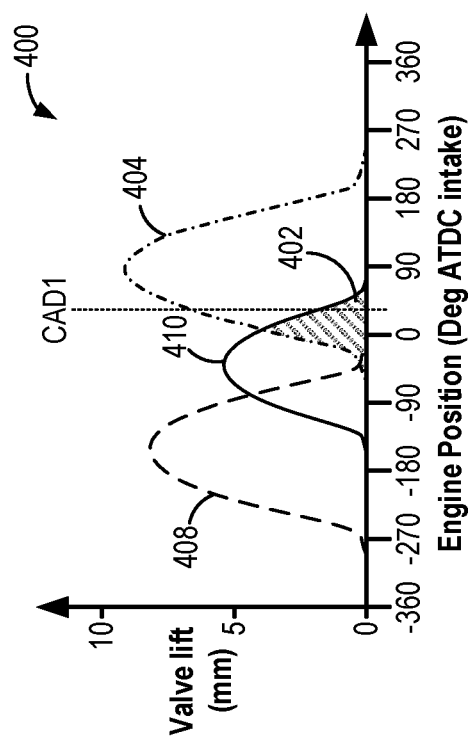

Now turning to FIG. 3, graph 300 depicts example valve timings with respect to a piston position for an engine cylinder comprising four valves: two intake valves and two exhaust valves, such as described above with reference to FIGS. 1 and 2. The cylinder is configured to receive intake air via the two intake valves (e.g., intake valves 2 and 4 introduced in FIG. 1), exhaust a first, blowdown portion of exhaust gas to a turbine inlet via a blowdown exhaust valve (e.g., first, or blowdown, exhaust valve 8 introduced in FIG.

1), exhaust a second, scavenging portion of exhaust gas to an intake passage via a scavenge exhaust valve (e.g., second, or scavenge, exhaust valve 6 introduced in FIG. 1), and provide non-combusted blowthrough air to the intake passage via the scavenge exhaust valve. By adjusting the timing of the opening and/or closing of the scavenge exhaust valve with that of the two intake valves, residual exhaust gases (and, in some examples, unburnt fuel) in the cylinder clearance volume may be flushed out and recirculated as EGR along with fresh intake blowthrough air.

Graph 300 illustrates an engine position along the horizontal axis in crank angle degrees (CAD). In the example of FIG. 3, relative differences in timings can be estimated by the drawing dimensions. However, other relative timings may be used, if desired. Plot 302 depicts piston position (along the vertical axis) relative to top dead center (TDC), bottom dead center (BDC), and the four strokes of an engine cycle (intake, compression, power, and exhaust). During the intake stroke, generally, the exhaust valves close and intake valves open. Air is introduced into the cylinder via the intake manifold and the corresponding intake ports, and the piston moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. During the compression stroke, the intake valves and the exhaust valves are closed. The piston moves toward the cylinder head so as to compress the air within the cylinder. The point at which the piston is at the end of its stroke and closest to the cylinder head (e.g., when the combustion chamber is at its smallest volume) is typically referred to as TDC. In a process herein referred to as injection, fuel is introduced into the combustion chamber. In a process herein referred to as ignition, the injected fuel is ignited, such as via a spark from a spark plug, resulting in combustion. During the expansion stroke, the expanding gases push the piston back down to BDC. A crankshaft (e.g., crankshaft 140 shown in FIG. 2) converts this piston movement into a rotational torque of the rotary shaft. During the exhaust stroke, the exhaust valves are opened to release the combusted air-fuel mixture to the corresponding exhaust passages, and the piston returns to TDC. In this description, the second exhaust (scavenge) valves may be opened after the beginning of the exhaust stroke and may stay open until after the end of the exhaust stroke, while the first exhaust (blowdown) valves are closed and the intake valves are opened to flush out residual exhaust gases with blowthrough air.

Plot 304 depicts an intake valve timing, lift, and duration for a first intake valve (Int_1), while plot 306 depicts an intake valve timing, lift, and duration for a second intake valve (Int_2), both intake valves coupled to the intake passage of the engine. Plot 308 depicts an example exhaust valve timing, lift, and duration for a blowdown exhaust valve (Exh_1), which may correspond to first exhaust valve 8 introduced in FIG. 1, coupled to a first exhaust manifold (e.g., blowdown exhaust manifold 84 shown in FIG. 1) via a first exhaust port (e.g., first exhaust port 86 of FIG. 1). Plot 310 depicts an example exhaust valve timing, lift, and duration for a scavenge exhaust valve (Exh_2), which may correspond to second exhaust valve 6 shown in FIG. 1, coupled to a scavenge manifold (e.g., scavenge manifold 80 shown in FIG. 1) via a second exhaust port (e.g., second exhaust port 82 of FIG. 1). As previously elaborated, the first exhaust manifold connects (e.g., fluidically couples) the blowdown exhaust valve to the inlet of a turbocharger turbine (e.g., dual-stage turbine 164 of FIG. 1), and the scavenge manifold connects (e.g., fluidically couples) the scavenge exhaust valve to an intake passage via an EGR passage (e.g., first EGR passage 50 shown in FIG. 1). The first exhaust manifold may be separate from the scavenge manifold, as explained above.

In the depicted example, the first and second intake valves are fully opened from a closed position (e.g., a valve lift of zero) at a common timing (plots 304 and 306), beginning near the intake stroke TDC just after CAD2 (e.g., at or just after the intake stroke TDC), and are closed after a subsequent compression stroke has commenced past CAD3 (e.g., after BDC). Additionally, when opened fully, the two intake valves may be opened with a same amount of valve lift L1 for a same duration of D1. In other examples, the two intake valves may be operated with a different timing by adjusting the phasing, lift, or duration.

In contrast to the common timing of the first and second intake valves, the timing of the blowdown exhaust valve opening and closing may be staggered relative to the scavenge exhaust valve opening and closing. Specifically, the blowdown exhaust valve (plot 308) is opened from a closed position at a first timing that is earlier in the engine cycle than the timing at which the scavenge exhaust valve (plot 310) is opened from a closed position. Specifically, the first timing for opening the blowdown exhaust valve is between TDC and BDC of the power stroke, before CAD1 (e.g., before the exhaust stroke BDC), while the timing for opening the scavenge exhaust valve is just after the exhaust stroke BDC, after CAD1 but before CAD2. The blowdown exhaust valve (plot 308) is closed before the end of the exhaust stroke, and the scavenge exhaust valve (plot 310) is closed after the end of the exhaust stroke. Thus, the scavenge exhaust valve remains open to overlap with the opening of the intake valves.

To elaborate, the blowdown exhaust valve (plot 308) may be fully opened from close before the start of an exhaust stroke (e.g., between 90 and 30 degrees before BDC, depending on cam phasing), maintained fully open through a first part of the exhaust stroke, and may be fully closed before the exhaust stroke ends (e.g., between 50 and 0 degrees before TDC, depending on cam phasing) to collect the blowdown portion of the exhaust pulse. The scavenge exhaust valve (plot 310) may be fully opened from a closed position just after the beginning of the exhaust stroke (e.g., between 30 and 90 degrees past BDC, depending on cam phasing), maintained open through a second portion of the exhaust stroke, and may be fully closed after the intake stroke begins (e.g., between 20 and 70 degrees after TDC, depending on cam phasing) to exhaust the scavenging portion of the exhaust. Additionally, the scavenge exhaust valve and the intake valves, as shown in FIG. 3, may have a positive overlap phase (e.g., from between 20 degrees before TDC and 30 degrees after TDC until between 30 and 90 degrees past TDC, depending on cam phasing) to allow blowthrough with EGR. This cycle, wherein all four valves are operational, may repeat itself based on engine operating conditions.

Additionally, the blowdown exhaust valve (plot 308) may be opened with a first amount of valve lift L2, while the scavenge exhaust valve (plot 310) may be opened with a second amount of valve lift L3, where L3 is smaller than L2. Further still, the blowdown exhaust valve may be opened at the first timing for a duration D2, while the scavenge exhaust valve may be opened for a duration D3, where D3 is smaller than D2. It will be appreciated that in other examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. Further, by conveying low pressure residual exhaust gases as EGR along with blowthrough air to the compressor inlet (via the first EGR passage and the scavenge manifold), combustion chamber temperatures can be lowered, thereby reducing an occurrence of knock and an amount of spark retard from maximum brake torque timing. Further, because the exhaust gases at the end of the exhaust stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to the turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blowthrough air is not routed to the catalyst, being directed to the compressor inlet instead, and therefore, excess fuel may not be injected into the exhaust gases to maintain a stoichiometric air-fuel ratio upstream of the catalyst.

However, a flow rate of the gas conveyed through the scavenge exhaust valve to the compressor inlet (via the first EGR passage and the scavenge manifold) varies based on the positive valve overlap phase (e.g., period) between the scavenge exhaust valve and the intake valve of a cylinder as well as relative pressures of the intake manifold and the scavenge manifold. Turning next to FIGS. 4A and 4B, valve diagrams 400 (FIG. 4A) and 450 (FIG. 4B) are shown, each having a horizontal axis representing engine position (in crank angle degrees after TDC of the intake stroke) and a vertical axis representing valve lift (in millimeters). For each of valve diagrams 400 and 450, an example valve timing, lift, and duration for a set of intake valves is shown in plot 404 (e.g., intake valves 2 and 4 introduced in FIG. 1), an example valve timing, lift, and duration for a first, blowdown exhaust valve is shown in plot 408 (e.g., blowdown exhaust valve 8 introduced in FIG. 1), and an example valve timing, lift, and duration for a second, scavenge exhaust valve is shown in plot 410 (e.g., scavenge exhaust valve 6 introduced in FIG. 1). In valve diagram 400 of FIG. 4A, the exhaust cam is advanced, causing the scavenge valve timing to be more advanced (e.g., open sooner in the exhaust stroke and close sooner in the intake stroke) and resulting in less valve overlap between the scavenge valve and the intake valves. For example, an intake cam timing and the exhaust cam timing results in a valve overlap area 402. In valve diagram 450 FIG. 4B, the exhaust cam is retarded, causing the scavenge valve timing to be more retarded (e.g., open later in the exhaust stroke and close later in the intake stroke) and resulting in more valve overlap between the scavenge valve and intake valves. For example, the intake cam timing and exhaust cam timing results in a valve overlap area 412, which is greater than valve overlap area 402 of valve diagram 400.

Further, due to the different exhaust cam timings of valve diagrams 400 and 450, there is a different amount of instantaneous scavenge valve to intake valve (SV-IV) overlap at a given engine position. For example, at an engine position CAD1, there is a greater amount of instantaneous SV-IV overlap in valve diagram 450 than valve diagram 400 (e.g., the height of valve overlap area 412 at CAD1 is greater than the height of valve overlap area 402 at CAD1). As will be described further below with respect to FIG. 5, the cylinder may be modeled as a variable orifice device, with the instantaneous SV-IV overlap defining a flow area of the variable orifice. The flow area of the variable orifice in turn affects a flow rate through the orifice. For example, a flow rate of gases from the intake valves, through the cylinder, and to the scavenge exhaust valve (and onto the scavenge manifold) may be higher with the exhaust cam timing shown in valve diagram 450 than with the exhaust cam timing shown in valve diagram 400. Thus, any deviations in exhaust cam timing may result in more or less flow total bulk flow (e.g., a flow of all gases, including burnt gases, air, and unburnt fuel) being recirculated through the EGR passage.

Figure 5:
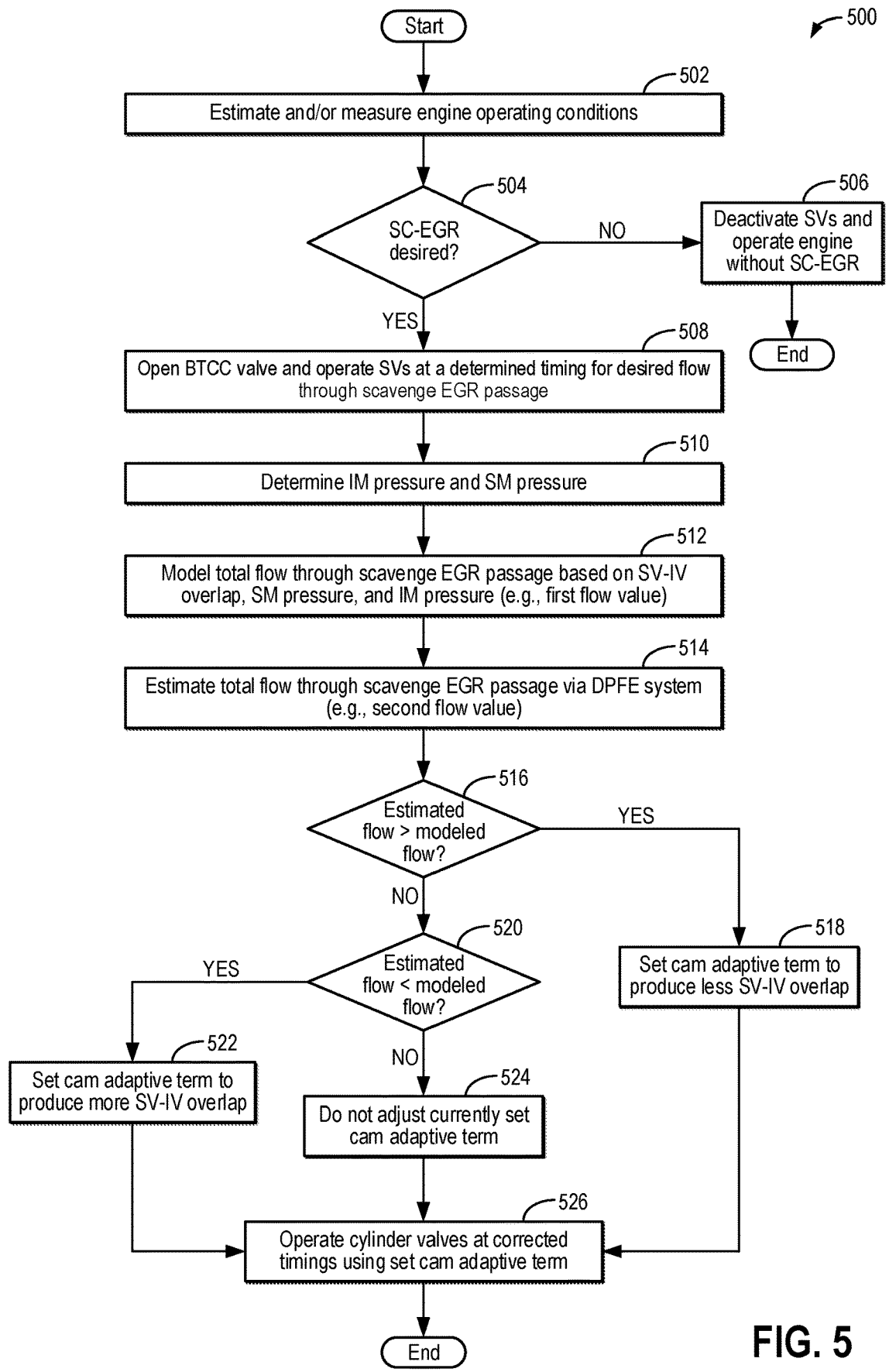
FIG. 5 shows a flow chart of an example method for adjusting a total flow through a scavenge exhaust gas recirculation passage via a cam timing correction.
Figure 6:
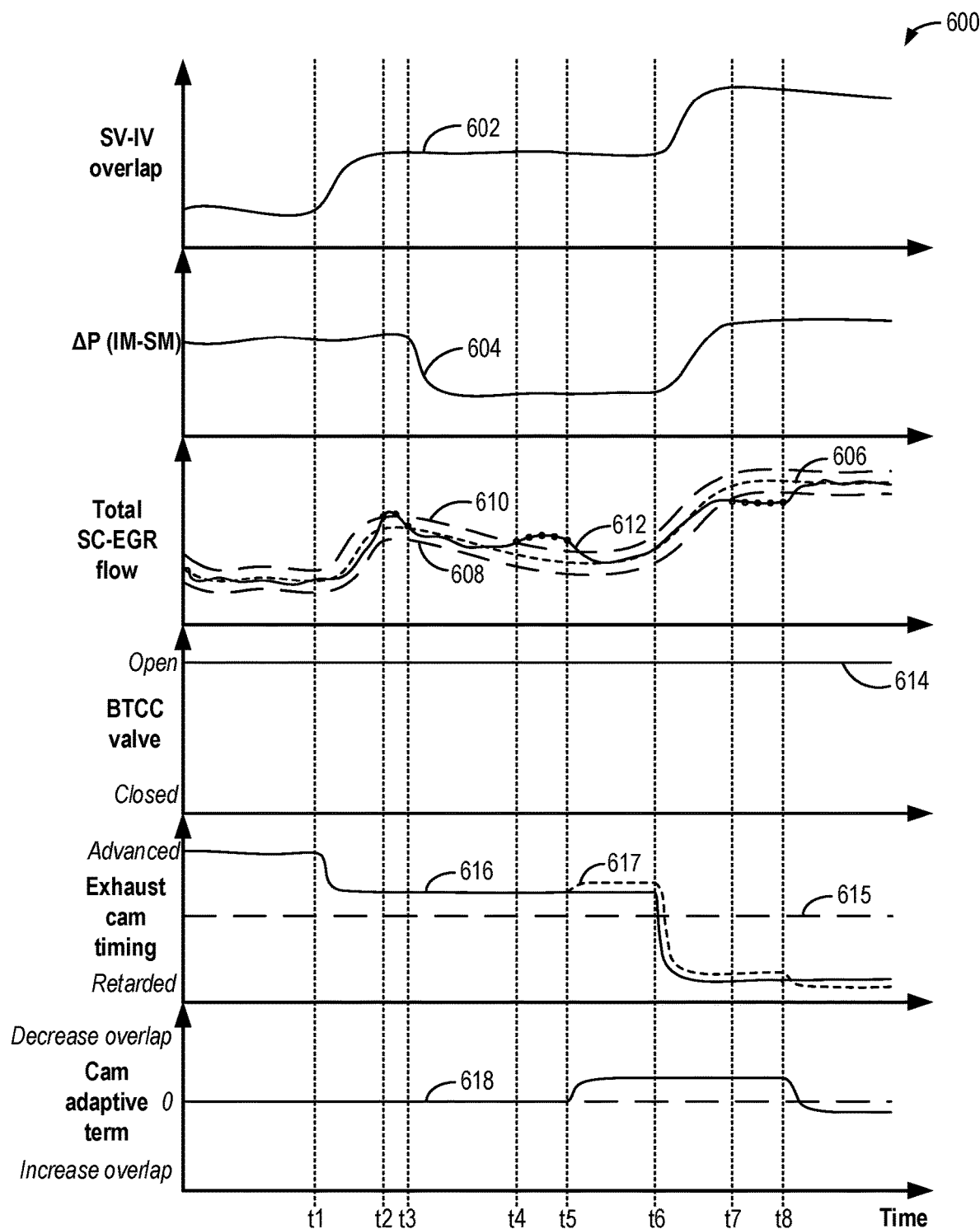
FIG. 6 shows an example timeline of correcting a total flow through a scavenge exhaust gas recirculation passage via a cam timing correction.

Turning to FIG. 5, a method 500 is shown for adjusting a total flow through a scavenge EGR passage (an EGR passage coupled between a scavenge exhaust manifold and an intake passage, upstream of a compressor). In one example, the scavenge EGR passage may be EGR passage 50 shown in FIG. 1, and the total flow through the scavenge EGR passage (including exhaust gas, fresh air, and unburnt fuel in varying proportions) may be referred to as SC-EGR. For example, SC-EGR delivery may become inaccurate due to cam timing errors, which may result in more or less EGR than expected. Thus, method 500 provides a method for generating a cam adaptive term to correct or compensate for these cam timing errors. Instructions for carrying out method 500 may be executed by a controller (e.g., controller 12 shown in FIGS. 1 and 2) based on instructions stored on a memory of the controller and in conjunction with signals received from sensors of the engine system, such as the sensors described above with reference to FIGS. 1 and/or 2 (e.g., pressure sensor 51 and pressure sensor 53 of FIG. 1). The controller may employ engine actuators of the engine system (e.g., intake valve timing actuator 101 and exhaust valve timing actuator 103 of FIG. 2) to adjust engine operation according to the methods described below.

At 502, method 500 includes estimating and/or measuring operating conditions. Operating conditions may include, for example, a brake pedal position, an acceleration pedal position, operator torque demand, ambient temperature and humidity, barometric pressure, engine speed, engine load, engine temperature, mass air flow (MAF), intake manifold pressure (MAP), intake manifold temperature, oxygen content of intake air/exhaust gases at various points in the engine system, a desired air-fuel ratio (AFR), an actual AFR, a timing of the cylinder intake and exhaust valves, positions of various valves of the engine system (including a BTCC valve), a temperature and/or loading level of one or more emission control devices, pressures in the exhaust system (e.g., a scavenge manifold pressure), etc. The operating conditions may be measured or inferred based on available data.

At 504, method 500 includes determining if SC-EGR is desired. For example, SC-EGR may be desired when the engine load is above a threshold load. The threshold load may be a non-zero engine load above which the engine may benefit from EGR and BTCC for reducing an occurrence of knock while increasing engine efficiency. In some examples, determining if SC-EGR is desired may further include determining a desired SC-ECR rate (or amount). The controller may input the engine load into a look-up table or map, which may output a corresponding SC-EGR rate for the input engine load. As an example, as the engine load increases from a low load to a mid load, the desired SC-EGR rate may increase, and as the engine load further increases from a mid load to a high load, the desired SC-EGR rate may decrease.

If SC-EGR is not desired, such as when the engine load is below the threshold load, method 500 proceeds to 506 and includes deactivating scavenge exhaust valves (e.g., second exhaust valves 6 shown in FIG. 1, abbreviated SVs) and operating the engine without SC-EGR. For example, this may include maintaining the scavenge exhaust valves closed and routing exhaust gases from the engine cylinders to an exhaust passage (e.g., via blowdown exhaust valves) and not to the scavenge exhaust manifold. As one example, the controller may send a deactivation signal to the valve actuators of the scavenge exhaust valves (e.g., exhaust valve timing actuator 103 shown in FIG. 2) to deactivate the SVs of every cylinder. Alternatively, if the scavenge exhaust valves are already deactivated, they may be maintained deactivated. Further, the method at 506 may include actuating the BTCC valve fully closed (or maintaining the BTCC valve fully closed if already closed). Further still, any additional EGR valves, such as a mid-pressure EGR valve (e.g., second EGR valve 59 of FIG. 1), may be maintained closed so that the engine is operated without external EGR. The method then ends.

If instead SC-EGR is desired at 504, method 500 proceeds to 508 and includes opening the BTCC valve (if closed) and operating the scavenge exhaust valves at a determined timing for the desired SC-EGR rate. For example, the scavenge exhaust valve timing (or exhaust cam timing) may be determined relative to a timing of intake valves (e.g., intake valves 2 and 4 shown in FIG. 1). The valve timings may be determined in terms of engine position (e.g., crank angle degrees). For example, the crank angle degrees at which the intake valves of a cylinder open and close may be determined, as well as the crank angle degrees at which the scavenge exhaust valve of the cylinder opens and closes. As one example, the controller may input the desired SC-EGR rate and the intake valve opening and closing timings into a look-up table, algorithm, or map stored in memory, which may output the corresponding scavenge exhaust valve opening and closing timings for providing the desired SC-EGR rate. Further, the controller may set the exhaust cam timing (or phasing) to produce the determined scavenge exhaust valve opening and closing timings. The resulting scavenge exhaust valve timings result in an opening overlap period between the scavenge exhaust valve and intake valves for each cylinder (e.g., a SV-IV overlap, as elaborated above with respect to FIGS. 3 and 4A-4B).

Additionally, the method at 508 may include determining, based on the determined valve timings, the current valve lift of the scavenge valve and the intake valves at the current time in the engine cycle (e.g., at the current crank angle degree in the engine cycle). This information may be used to determine an instantaneous valve overlap area between the scavenge valve and intake valves, as further described below at 512.

In an alternative example, the SV timing may dictate the resulting SC-EGR rate instead of determining the SV timing based on the desired SC-EGR rate. For example, the controller may input the engine operating conditions, such as the engine speed and load, into one or more look-up tables, algorithms, and maps, which may output the corresponding SV timing for the input operating conditions. The controller may then set the exhaust cam timing (or phasing) to produce the determined SV timing and may further determine the resulting SC-EGR rate based on the determined SV timing.

At 510, method 500 includes determining the intake manifold (IM) pressure and the scavenge exhaust manifold (SM) pressure. In one example, the intake manifold and scavenge exhaust manifold pressures may be estimated based on additional engine operating conditions, such as pressures and/or flows upstream and/or downstream of the desired locations. In another example, the intake manifold and scavenge exhaust manifold pressures may be measured. For example, the intake manifold pressure may be estimated and/or measured from an output of a pressure sensor arranged within the intake manifold (e.g., pressure sensor 37 shown in FIG. 1). As another example, the scavenge exhaust manifold pressure may be estimated and/or measured from an output of a pressure sensor arranged within the scavenge exhaust manifold (e.g., pressure sensor 34 arranged in second exhaust manifold 80). For example, the pressure measurements may be obtained from the corresponding pressure sensors via high-frequency sampling (e.g., one millisecond or 5 degree sampling). Further, these pressure measurements may be crank angle-aligned so that the current intake manifold pressure and the current scavenge exhaust manifold pressure (e.g., at the current time in the engine cycle) may be obtained.

At 512, method 500 includes modeling a total flow through the scavenge EGR passage based on the SV-IV overlap, the scavenge exhaust manifold pressure, and the intake manifold pressure. For example, the total flow through the scavenge EGR passage may be determined at a current time in the engine cycle. Each cylinder, between the intake valves and scavenge exhaust valve, may be modeled as a variable orifice device that controls the flow through the cylinder and into the scavenge exhaust manifold using the relative opening between the scavenge exhaust valve and intake valves (of the cylinder) during the SV-IV overlap period (where the intake valves and scavenge valve of a cylinder are all at least partially open). The flow rate through this "orifice," and thus into the scavenge exhaust manifold, may be related to the flow area (e.g., overlap area between the intake valves and scavenge exhaust valve) of the orifice using a standard orifice equation. An example of such an orifice equation, used to determine total flow across an orifice (in this case, considered to be between the scavenge exhaust valve and the corresponding intake valves), is presented by the equations below:

$$Q_{SV-IV} = g_1(P_{IM}, P_{SM})g_2(\theta), \quad \text{(Equation 1)}$$

$$g_1(P_{IM}, P_{SM}) = \frac{A_{SV-IV}P_{SM}}{\sqrt{R_{air}T_{IM}}}\left(\frac{P_{IM}}{P_{SM}}\right)^{\frac{1}{\gamma}}\sqrt{\frac{2\gamma}{\gamma-1}\left[1-\left(\frac{P_{IM}}{P_{SM}}\right)^{\frac{\gamma-1}{\gamma}}\right]}, \quad \text{(Equation 2)}$$

$$g_2(\theta) = C_D(\theta), \quad \text{(Equation 3)}$$

where $Q_{SV-IV}$ is the total flow through the cylinder from the intake valves to the scavenge exhaust valve, which may be assumed to be the total bulk flow through the scavenge EGR passage. In the above equations, $P_{IM}$ is the intake manifold pressure, $P_{SM}$ is the scavenge exhaust manifold pressure, and A is the relative opening angle between the intake valves and scavenge exhaust valve (e.g., a fraction or percentage opening overlap out of a total amount of possible overlap between the intake valves and the scavenge exhaust valve).

In Equation 2, $A_{SV-IV}$ is the valve overlap area between the intake valves and the scavenge exhaust valve (which is a function of the valve lift profiles for the intake valves and scavenge exhaust valve at the current crank angle), $R_{air}$ is the universal gas constant of air, $T_{IM}$ is the temperature in the intake manifold, and $\gamma$ is the specific weight of the gases. In Equation 3, $C_D(\theta)$ is an angle dependent discharge coefficient. The multiplication of area and the discharge coefficient provide an equivalent effect to the valve overlap factor. Thus, using an orifice equation, such as those presented above in Equations 1-3, the determined intake manifold and scavenge exhaust manifold pressures at the current crank angle, and the valve overlap area at the current crank angle, the current flow through the scavenge EGR passage may be determined. This total bulk flow amount may change over time, as the pressures and valve overlap area changes.

In one example, the method at 512 may additionally include filtering out a pulsation effect on scavenge exhaust manifold pressure and estimating a transport delay in the modeled total flow through the scavenge EGR passage based on engine speed. For example, as engine speed increases, pulsations in the flow may also increase. Thus, a relationship between engine speed and scavenge exhaust manifold pressure pulsations may be determined (e.g., from engine mapping/modeling) and stored in the memory of the controller as a look-up table or mathematical relationship, where engine speed is the input, and a correction to the determined (e.g., measured) scavenge exhaust manifold pressure is the output. Thus, based on a determined engine speed (e.g., estimated and/or measured from one or more engine sensors), the controller may input the engine speed into the stored look-up table or relationship and receive a scavenge exhaust manifold pressure correction as the output. The controller may then correct the measured or estimated scavenge exhaust manifold pressure using the determined correction and use the corrected scavenge exhaust manifold pressure in the orifice equation to model the total (e.g., bulk) flow through the scavenge EGR passage, as described above. Similarly, a transport delay may be determined based on a measured and/or estimated engine speed and used to adjust or update the modeled total bulk flow through the scavenge EGR passage, which may serve as a first flow value.

Continuing to 514, method 500 includes estimating the total flow through the scavenge EGR passage via a delta pressure feedback of EGR (DPFE) system. As described above with respect to FIG. 1, the DPFE system may include a first pressure sensor (e.g., pressure sensor 51 of FIG. 1) that may output a first pressure measurement (P1) to the controller indicative of an intake pressure upstream of where the scavenge EGR passage couples to the intake passage and a second pressure sensor (e.g., pressure sensor 53 of FIG. 1) that may output a second pressure measurement (P2) to the controller indicative of a pressure in the scavenge EGR passage upstream of the BTCC valve. The controller may calculate a delta pressure (dP) from the first pressure measurement and the second pressure measurement by subtracting P1 from P2 (e.g., dP=P2−P1). As another example, a single dP sensor may output a single dP measurement to the controller. The controller may input the dP value into a look-up table, map, or equation stored in memory, which may output the corresponding flow rate through the scavenge EGR passage (e.g., a second flow value). In one non-limiting example, the controller may calculate the flow rate through the scavenge EGR passage based on the two pressure measurements (or the pressure differential) using Bernoulli's equation. In general, as the dP value increases (e.g., P2 increases relative to P1), the estimated flow through the scavenge EGR passage increases. Further, the estimated total flow through the scavenge EGR passage may be crank angle-aligned (e.g., time-aligned) with the modeled total flow through the scavenge EGR passage (e.g., as modeled at 512). Thus, the controller may determine the SC-EGR flow in two different ways that use different, non-overlapping sets of parameters. For example, the first flow value (e.g., the modeled flow) may be determined based on the SV-IV overlap in addition to pressure values (e.g., the intake manifold pressure and the scavenge manifold pressure), whereas the second flow value (e.g., the estimated flow) may be determined independent of the SV-IV overlap and based on different pressure values than the first flow value (e.g., the pressure of the scavenge EGR passage and the pressure of the intake passage).

At 516, method 500 includes determining if the estimated flow (e.g., as determined based on the DPFE system measurements at 514) is greater than the modeled flow (e.g., as modeled at 512). As one example, the controller may directly compare the first flow value, corresponding to the modeled flow rate (e.g., a first determination of the SC-EGR flow), to the time- and crank angle-aligned second flow value, corresponding to the estimated flow rate (e.g., a second determination of the SC-EGR flow) to determine if the estimated flow is greater than the modeled flow. The estimated flow may be determined to be greater than the modeled flow when the estimated flow is at least a threshold amount greater than the modeled flow. The threshold amount may be a non-zero pre-determined fixed value or may be a non-zero pre-determined percentage value that allows for slight discrepancies between the modeled flow and the estimated flow. As a non-limiting example, the pre-determined percentage value may be a value within a range from 0.5-5%. As an illustrative example, the pre-determined percentage value may be 2%, and the estimated flow rate may be considered greater than the modeled flow rate when it is 2% greater than the modeled flow rate.

Further still, the estimated flow may be determined to be greater than the modeled flow when the estimated flow is at least the threshold amount greater than the modeled flow for at least a threshold number of replicates. As one example, each replicate may include a set of time- and crank angle-aligned flow values (e.g., one modeled flow rate and a corresponding estimated flow rate for each set) that are spaced apart by a non-zero pre-determined duration or by a non-zero pre-determined number of crank angle degrees. In one non-limiting example, the threshold number of replicates may be a value in a range from 3-30. As an illustrative example, the threshold number of replicates may be 5, and the estimated flow may be considered greater than the modeled flow when the estimated flow remains greater than the modeled flow for 5 replicates, indicating that the estimated flow is consistently and stably greater than the modeled flow. In an alternative example, the estimated flow may be determined to be greater than the modeled flow when the estimated flow remains at least the threshold amount greater than the modeled flow for at least a non-zero threshold duration, which in some examples, may be equal to the threshold number of replicates (such as where the replicates are each spaced apart by the pre-determined duration). In this way, the threshold amount and the threshold number of replicates (or the threshold duration) may provide a hysteresis logic so that the flow through the scavenge EGR passage is not prematurely and/or rapidly adjusted via cam timing corrections, as will be further described below.

If the estimated flow is greater than the modeled flow, such as when the estimated flow is at least the threshold amount greater than the modeled flow for the threshold number of replicates (or threshold duration), method 500 proceeds to 518 and includes setting a cam adaptive term to produce less SV-IV overlap. For example, the cam adaptive term may include an exhaust cam phasing term and/or an intake cam phasing term that decreases a duration of the SV-IV overlap. As one example, setting the cam adaptive term to produce less SV-IV overlap may include setting the exhaust cam phasing term to advance the exhaust cam relative to the intake cam (and relative to a set exhaust cam timing) so that the scavenge exhaust valve closes earlier with respect to the intake valve opening timing, such as shown in FIG. 4A. For example, a degree of the advancing may be proportional to a magnitude of a difference between the estimated flow and the modeled flow such that as the magnitude of the difference increases, the degree of the advancing may increase. As another example, setting the cam adaptive term to produce less SV-IV overlap may include setting the intake cam phasing term to retard the intake cam relative to the exhaust cam (and relative to a set intake cam timing) so that the intake valves open later with respect to the scavenge exhaust valve closing timing. A degree of the retarding may be proportional to the magnitude of the difference between the estimated flow and the modeled flow. As still another example, setting the cam adaptive term to produce less SV-IV overlap may include setting both the exhaust cam phasing term to advance the exhaust cam and setting the intake cam phasing term to retard the intake cam.

In some examples, the controller may input the difference between the estimated flow and the modeled flow into a look-up table, algorithm, or map stored in memory, which may output the degree of advancement to the exhaust cam and/or the degree of retardation for the intake cam to set for the cam adaptive term(s). By setting the cam adaptive term to produce less SV-IV overlap, the flow through the scavenge EGR passage may be decreased. Note that while the cam adaptive term may result in advancing the exhaust cam timing and/or retarding the intake cam timing, the advancing or retarding is relative to the set (e.g., commanded) timing, and thus, the resulting exhaust cam timing may be considered retarded and/or the resulting intake valve timing may be considered advanced relative to a pre-determined crank angle that typically separates a timing advance from a timing retard for the corresponding valve. Method 500 may then proceed to 526, as will be described below.

If instead the estimated flow is not greater than the modeled flow at 516, such as when the estimated flow is not at least the threshold amount greater than the modeled flow or does not remain at least the threshold amount greater than the modeled flow for the threshold number of replicates (or the threshold duration), method 500 proceeds to 520 and includes determining if the estimated flow is less than the modeled flow. As one example, the controller may directly compare the first flow value corresponding to the modeled flow rate to the time- and crank angle-aligned second flow value corresponding to the estimated flow rate to determine if the estimated flow is less than the modeled flow. The estimated flow rate may be determined to be less than the modeled flow rate when the estimated flow rate is at least the threshold amount less than the modeled flow rate (e.g., the threshold amount described above with respect to 516). Thus, the threshold amount may be used to generate a threshold range centered around the modeled flow rate such that any estimated flow rate within the threshold range may be considered to be substantially equal to the modeled flow rate, and any estimated flow rate outside of the threshold range may be considered to be not equal to the modeled flow rate.

Further, the estimated flow may be determined to be less than the modeled flow when the estimated flow is at least the threshold amount less than the modeled flow for at least the threshold number of replicates (or the threshold duration), as also described above at 516. Extending the above illustrative example of the threshold number of replicates being 5, the estimated flow may be considered less than the modeled flow when the estimated flow remains less than the modeled flow for 5 replicates, indicating that the estimated flow is consistently and stably less than the modeled flow.

If the estimated flow is less than the modeled flow, such as when the estimated flow is at least the threshold amount less than the modeled flow for the threshold number of replicates (or threshold duration), method 500 proceeds to 522 and includes setting the cam adaptive term to produce more SV-IV overlap. For example, the cam adaptive term may include an exhaust cam phasing term and/or an intake cam phasing term that increases a duration of the SV-IV overlap. As one example, setting the cam adaptive term to produce more SV-IV overlap may include setting the exhaust cam phasing term to retard the exhaust cam relative to the intake cam (and relative to the set exhaust cam timing) so that the scavenge exhaust valve closes later with respect to the intake valve opening timing, such as shown in FIG. 4B. For example, a degree of the retarding may be proportional to the magnitude of the difference between the estimated flow and the modeled flow such that as the magnitude of the difference increases, the degree of the retarding may increase. As another example, setting the cam adaptive term to produce more SV-IV overlap may include setting the intake cam phasing term to advance the intake cam relative to the exhaust cam (and relative to the set intake cam timing) so that the intake valves open further before the scavenge exhaust valve closes. A degree of the advancing may be proportional to the magnitude of the difference between the estimated flow and the modeled flow. As still another example, setting the cam adaptive term to produce more SV-IV overlap may include both setting the exhaust cam phasing term to retard the exhaust cam and setting the intake cam phasing term to advance the intake cam.

In some examples, the controller may input the difference between the estimated flow and the modeled flow into a look-up table, algorithm, or map stored in memory, which may output the degree of retardation to the exhaust cam and/or the degree of advancement for the intake cam to set for the cam adaptive term(s). Note that while the cam adaptive term may result in retarding the exhaust cam timing and/or advancing the intake cam timing, the retarding or advancing is relative to the set timing, and thus, the resulting exhaust cam timing may be considered advanced and/or the resulting intake valve timing may be considered retarded relative to the pre-determined crank angle that typically separates advanced timing from retarded timing for the corresponding valve. By setting the cam adaptive term to produce more SV-IV overlap, the flow through the scavenge EGR passage may be increased. Method 500 may then proceed to 526, as will be described below.

If instead the estimated flow is not less than the modeled flow at 520, such as when the estimated flow is not at least the threshold amount less than the modeled flow or does not remain at least the threshold amount less than the modeled flow for the threshold number of replicates (or threshold duration), method 500 proceeds to 524 and includes not adjusting a currently set cam adaptive term. For example, with the estimated flow through the scavenge EGR passage substantially equal to the flow through the scavenge EGR passage predicted via variable orifice modeling, the current cam timing results in a desired, predictable amount of flow through the scavenge EGR passage and to the engine intake, upstream of the compressor. Thus, the timing of the scavenge exhaust valves and/or the intake valves is not adjusted via the cam adaptive term. In one example, the current cam adaptive term is set at zero, indicating nominal system behavior, and remains set at zero. In another example, the cam adaptive term is set to a non-zero value (e.g., due to a previous adjustment) and is not further adjusted.

At 526, method 500 includes operating the cylinder valves at corrected timings using the set cam adaptive term. Thus, whether the cam adaptive term is set to decrease SV-IV overlap (e.g., as at 518), increase SV-IV overlap (e.g., as at 522), or set to zero (e.g., at 524), the cylinder valves are operated to achieve a desired amount of SV-IV overlap for the desired SC-EGR flow. For example, the intake valves may be actuated at a corrected intake valve timing via the intake valve actuator by adding the cam adaptive term to the commanded intake cam timing, and/or the scavenge exhaust valve may be actuated at a corrected scavenge exhaust valve timing the exhaust valve actuator by adding the cam adaptive term to the commanded exhaust cam timing. Thus, the commanded timing of the intake valves and the scavenge exhaust valve may not be adjusted, but the resulting (e.g., actual) corrected timing may be offset from the commanded timing by to the cam adaptive term (e.g., when the cam adaptive term is non-zero). In this way, the controller may continue to model the total flow through the scavenge EGR passage (e.g., at 512) based on the commanded valve timings and not using the actual, corrected valve timings resulting from the inclusion of the set cam adaptive term. Method 500 may then end.

As one example, method 500 may be repeated to ensure that the set cam adaptive term results in the estimated flow being substantially equal to the modeled flow, and the cam adaptive term may be adjusted responsive to the estimated flow not being equal to the modeled flow. As another example, method 500 may be repeated so that the cam adaptive term may be updated as operating conditions change to ensure that SC-EGR is accurately provided across operating conditions.

In this way, error in SC-EGR delivery may be detected and corrected through an adaptive correction term to cam timing, which results in opening intake and/or exhaust valves earlier or later to change an amount (e.g., duration and/or area) of overlap between the intake valves and the scavenge exhaust valve. Such a cam adaptive term enables even SC-EGR systems having two-state, on-off valves to be controlled, increasing engine performance and decreasing power delivery interruptions. Further, an occurrence of knock may be reduced while fuel economy may be increased by accurately delivering SC-EGR.

Turning to FIG. 6, an example timeline 600 shows adjustments to a cam adaptive term based on an estimated total SC-EGR flow (e.g., estimated based on measurements from a DPFE system) relative to a modeled total SC-EGR flow (e.g., modeled via a variable orifice equation). Specifically, timeline 600 shows a valve opening overlap period between a scavenge exhaust valve and intake valves of each cylinder (e.g., a total overlap area throughout an engine cycle, referred to below as SV-IV overlap) at plot 602, a pressure drop from an intake manifold to a scavenge exhaust manifold (e.g., the pressure drop across a "variable orifice" created by the SV-IV overlap) at plot 604, the modeled total SC-EGR flow (e.g., the modeled total bulk flow through a scavenge EGR passage) at plot 606, the estimated total SC-EGR flow at plot 612, a position of a BTCC valve (e.g., valve 54 arranged in the scavenge EGR passage shown in FIG. 1) at plot 614, a set exhaust cam timing (and thus scavenge exhaust valve timing) at plot 616, and a set cam adaptive term at plot 618. In the example of timeline 600, the cam adaptive term is used to correct exhaust cam timing (and thus scavenge exhaust valve timing). However, in other examples, the cam adaptive term may be used to correct intake cam timing or a combination of exhaust cam timing and intake cam timing.

For all of the above, the horizontal axis represents time, with time increasing along the horizontal axis from left to right. The vertical axis of each plot represents the corresponding labeled parameter. For plots 602, 604, 606, and 612, a value of each labeled parameter increases along the vertical axis from bottom to top. For plot 614, the vertical axis represents whether the BTCC valve is fully open (e.g., "open," as labeled) or fully closed (e.g., "closed," as labeled). For plot 616, the vertical axis represents whether the exhaust cam timing is advanced or retarded, as labeled, with a degree of advancement increasing up the vertical axis as a distance from a dashed line 615 increases and a degree of retardation increasing down the vertical axis as a distance from dashed line 615 increases. Dashed line 615 may be a pre-determined exhaust cam timing that typically separates advanced timing from retarded timing, for example. For plot 618, the vertical axis represents whether the cam adaptive term is adjusted from zero to increase SV-IV overlap ("increase overlap," as labeled) or decrease SV-IV overlap ("decrease overlap," as labeled). For example, zero corresponds to no cam timing correction for adjusting SC-EGR flow. Further, the modeled total SC-EGR flow (plot 606) is bounded by a first, lower threshold 608 and a second, upper threshold 610, the lower threshold 608 and the upper threshold 610 defining a range of values for which the estimated total SC-EGR flow (plot 612) is considered equivalent to the modeled total SC-EGR flow (plot 606).

Prior to time t1, the BTCC valve is open (plot 614) to provide SC-EGR. The cam adaptive term is set to zero (plot 618), indicating that the exhaust cam timing has not been offset to compensate for cam timing errors that may result in inaccurate SC-EGR flow. The SV-IV overlap is relatively low (plot 602) and as a result, the total SC-EGR flow is relatively low (plots 606 and 612). For example, the amount of SV-IV overlap may be selected to provide a desired engine dilution and may be calculated based on set scavenge exhaust valve (e.g., exhaust cam) and intake valve (e.g., intake cam) timings. Further, the estimated total SC-EGR flow (plot 612) is between the lower threshold 608 and the upper threshold 610, and thus, the estimated total SC-EGR flow is equal to the modeled total SC-EGR flow (plot 606), such as predicted based on the SV-IV overlap shown in plot 602 and the pressure drop between the intake manifold (IM) and the scavenge exhaust manifold (SM) shown in plot 604.

Shortly after time t1, the desired engine dilution changes, and an increased total SC-EGR flow is desired. In response to this condition, a controller may actuate a cam timing actuator to retard the exhaust cam timing relative to its current timing (plot 616). In response to retarding the exhaust cam timing, the SV-IV overlap increases (plot 602), thereby increasing the total SC-EGR flow (plots 606 and 612). Further, at time t2, the estimated total SC-EGR flow (plot 612) increases above the modeled total SC-EGR flow (plot 606) by surpassing the upper threshold 610. Thus, a first criterion for considering the estimated total SC-EGR flow to be greater than the modeled total SC-EGR flow is met.

However, the measurement at time t2 serves as a first replicate, indicated by a point on plot 612, and in the illustrative example of timeline 600, a second criterion for considering the estimated total SC-EGR flow to be greater than the modeled total SC-EGR flow includes the estimated flow remaining above the modeled flow for at least 5 replicates. The controller repeats the measurement a pre-determined duration later for a second replicate, and the estimated total SC-EGR flow (plot 612) remains above the upper threshold 610. However, the estimated total SC-EGR flow (plot 612) then decreases, and a third replicate measured at time t3 (e.g., the pre-determined duration after the second replicate) is less than the upper threshold 610 (and greater than the lower threshold 608). Thus, the estimated total SC-EGR flow (plot 612) is not considered to be greater than the modeled total SC-EGR flow (plot 606), and the cam adaptive term remains set to zero (plot 618).

Also at time t3, the pressure drop between the intake manifold and the scavenge exhaust manifold decreases (plot 604), causing the total SC-EGR flow to decrease (plots 606 and 612) due to the SV-IV overlap (plot 602) remaining relatively constant. However, in other examples, the controller may adjust the SV-IV overlap to maintain the SC-EGR flow in response to the pressure drop decreasing.

At time t4, the estimated total SC-EGR (plot 612) again increases above the upper threshold 610. The controller takes four additional measurements for a total of five replicates that are spaced apart by the pre-determined duration, with each of the additional total SC-EGR flow measurements remaining above the upper threshold 610. In response to the fifth replicate indicating that the estimated total SC-EGR flow (plot 612) is greater than the modeled total SC-EGR flow (plot 606) at time t5. For example, due to a cam timing error, the actual SV-IV overlap may be greater than the determined SV-IV overlap (plot 602), which may be determined based on commanded cam timings that do not account for the timing error.

Therefore, at time t5, the controller sets the cam adaptive term to decrease the SV-IV overlap (plot 618). As a result of the set cam adaptive term, a corrected exhaust cam timing (dashed segment 617) is further advanced from the set exhaust cam timing (plot 616), causing the scavenge exhaust valve of each cylinder to open and close sooner in each engine cycle. This results in a corrected SV-IV overlap and brings the estimated total SC-EGR flow (plot 612) back between the upper threshold 610 and the lower threshold 608, making the estimated total SC-EGR flow equal to the modeled total SC-EGR flow (plot 606).

After time t6, the controller retards the exhaust cam timing (plot 616) in order to increase the SV-IV overlap (plot 602). However, the cam adaptive term remains set to decrease the SV-IV overlap relative, resulting in a corrected exhaust cam timing (dashed segment 617) that is more advanced than the set exhaust cam timing (plot 616). Further, the pressure drop between the intake manifold and the scavenge exhaust manifold increases (plot 604). Due to the high SV-IV overlap and the high pressure drop between the intake manifold and the scavenge exhaust manifold, the total SC-EGR flow (plots 606 and 612) increases.

At time t7, the estimated total SC-EGR flow (plot 612) decreases below the lower threshold 608. After four additional replicates are obtained, at time t8, the estimated total SC-EGR flow (plot 612) still remains below the lower threshold 608, and the estimated total SC-EGR flow is determined to be less than the modeled total SC-EGR flow (plot 606). For example, due to a cam timing error, the actual SV-IV overlap may be less than the determined SV-IV overlap (plot 602), as determined based on commanded cam timings that do not account for the timing error.

In response, at time t8, the controller adjusts the cam adaptive term (plot 618) to increase the SV-IV overlap. As a result of the set cam adaptive term, the corrected exhaust cam timing (dashed segment 617) is further retarded from the set exhaust cam timing (plot 616), causing the scavenge exhaust valve of each cylinder to open and close later in each engine cycle. This results in a corrected SV-IV overlap and brings the estimated total SC-EGR flow (plot 612) back between the upper threshold 610 and the lower threshold 608, making the estimated total SC-EGR flow equal to the modeled total SC-EGR flow (plot 606).

In this way, the total flow through a scavenge EGR passage, routed between a scavenge exhaust manifold and an intake passage, upstream of a compressor, may be determined a first way based on valve opening overlap area between the scavenge valves and intake valves and a pressure difference between the intake manifold and scavenge manifold. This first determination may utilize pressure measurements in the intake manifold and scavenge manifold, for example, resulting in a modeled flow through the scavenge EGR passage. The total flow through the scavenge EGR passage may also be determined a second way using a delta pressure measurement system, resulting in an estimated flow through the scavenge EGR passage. By comparing the estimated flow to the modeled flow, cam timing errors that result in more or less flow than modeled may be identified and corrected via a cam adaptive term. In this way, SC-EGR may be accurately delivered without use of a variable EGR valve, increasing engine performance, decreasing an occurrence of knock, and decreasing power delivery interruptions.

The technical effect of setting a cam adaptive term responsive to an estimated flow through a scavenge EGR passage relative to a modeled flow through the scavenge EGR passage is that cam timing errors can be identified and corrected, thereby increasing an accuracy of EGR delivery.

As one example, a method comprises: setting a cam timing correction based on a difference between a first determination and a second determination of a flow through an exhaust gas recirculation (EGR) passage, the first determination based on a cylinder valve overlap and the second determination independent of the cylinder valve overlap; and operating at least one of an intake cam and an exhaust cam at a corrected timing using the cam timing correction. In the preceding example, additionally or optionally, the EGR passage couples a scavenge exhaust manifold to an intake passage of an engine; the scavenge exhaust manifold is coupled to each cylinder of the engine via a scavenge exhaust valve, the scavenge exhaust valve controlled via the exhaust cam; the intake passage is coupled to each cylinder via an intake manifold and an intake valve, the intake valve controlled via the intake cam; and the cylinder valve overlap is an opening overlap area between the scavenge exhaust valve and the intake valve. In one or both of the preceding examples, additionally or optionally, each cylinder is coupled to an exhaust passage via a blowdown exhaust valve and a blowdown manifold, the blowdown exhaust valve opening and closing earlier in an engine cycle than the scavenge exhaust valve. In any or all of the preceding examples, additionally or optionally, the opening overlap area is determined based on a valve lift of the intake valve and a valve lift of the scavenge exhaust valve at a current crank angle. In any or all of the preceding examples, additionally or optionally, the first determination is further based on a pressure of the intake manifold and a pressure of the scavenge manifold, the pressure of the intake manifold and the pressure of the scavenge manifold crank angle-aligned to correspond to the current crank angle. In any or all of the preceding examples, additionally or optionally, the second determination is based on a delta pressure between the intake passage and the EGR passage, the delta pressure crank angle-aligned to correspond to the current crank angle. In any or all of the preceding examples, additionally or optionally, the delta pressure is determined based on a difference between a pressure of the EGR passage and a pressure of the intake passage, upstream of a junction of the EGR passage and the intake passage. In any or all of the preceding examples, additionally or optionally, setting the cam timing correction based on the difference between the first determination and the second determination includes: responsive to the second determination being greater than the first determination, setting the cam timing correction to decrease the opening overlap area between the scavenge exhaust valve and the intake valve; and responsive to the second determination being less than the first determination, setting the cam timing correction to increase the opening overlap area between the scavenge exhaust valve and the intake valve. In any or all of the preceding examples, additionally or optionally, the second determination being greater than the first determination includes the second determination being at least a threshold amount greater than the first determination for at least a threshold duration, and the second determination being less than the first determination includes the second determination being at least the threshold amount less than the first determination for the threshold duration. In any or all of the preceding examples, additionally or optionally, the cam timing correction to decrease the opening overlap area between the scavenge exhaust valve and the intake valve includes at least one of setting the cam timing correction to advance a timing of the exhaust cam and setting the cam timing correction to retard a timing of the intake cam. In any or all of the preceding examples, additionally or optionally, setting the cam timing correction to increase the opening overlap area between the scavenge exhaust valve and the intake valve includes at least one of setting the cam timing correction to retard a timing of the exhaust cam and setting the cam timing correction to advance a timing of the intake cam.

As another example, a method comprises: adjusting a cam adaptive term based on a first flow rate of gases through a scavenge exhaust gas recirculation (SC-EGR) passage to an intake passage of an engine and a second flow rate of the gases, the first flow rate determined based on a valve opening overlap area between scavenge exhaust valves and intake valves coupled to cylinders of the engine, the intake valves coupling the cylinders to an intake manifold and the scavenge exhaust valves coupling the cylinders to the SC-EGR passage via a scavenge manifold, and the second flow rate determined based on a delta pressure between the SC-EGR passage and the intake passage; and operating at least one of an intake cam and an exhaust cam at a corrected timing based on the cam adaptive term. In the preceding example, additionally or optionally, the first flow rate is further determined based on pressures in each of the intake manifold and the scavenge manifold, and adjusting the cam adaptive term based on the first flow rate and the second flow rate includes: adjusting the cam adaptive term to increase the valve opening overlap area between the scavenge exhaust valves and intake valves responsive to the second flow rate being less than the first flow rate; adjusting the cam adaptive term to decrease the valve opening overlap area between the scavenge exhaust valves and the intake valves responsive to the second flow rate being greater than the first flow rate; and maintaining a current cam adaptive term responsive to the second flow rate being equal to the first flow rate. In one or both of the preceding examples, additionally or optionally, the second flow rate being greater than the first flow rate includes the second flow rate being at least a threshold amount greater than the first flow rate for a threshold number of time-aligned replicates of the first flow rate and the second flow rate. In any or all of the preceding examples, additionally or optionally, the second flow rate being less than the first flow rate includes the second flow rate being at least the threshold amount less than the first flow rate for the threshold number of time-aligned replicates or the first flow rate and the second flow rate.

As another example, a system for an engine comprises: a plurality of cylinders, each including an intake valve, a scavenge exhaust valve, and a blowdown exhaust valve; an intake manifold coupled to the intake valve of each cylinder and an intake passage; a scavenge manifold coupled to the scavenge exhaust valve of each cylinder and the intake passage, upstream of a compressor, via a scavenge exhaust gas recirculation (SC-EGR) passage; a blowdown manifold coupled to the blowdown exhaust valve of each cylinder and an exhaust passage including a turbine; and a controller storing computer readable instructions on non-transitory memory that, when executed during engine operation, cause the controller to: determine a first value of a total flow of gases through the SC-EGR passage based on a valve opening overlap area between the scavenge exhaust valve and the intake valve; determine a second value of the total flow of gases through the SC-EGR passage based on a delta pressure between the intake passage and the SC-EGR passage, the second value time-aligned with the first value; and adjust an operating parameter of the engine based on the first value and the second value. In the preceding example, additionally or optionally, the first value is further determined based on a measured pressure in the intake manifold and a measured pressure in the scavenge manifold. In any or all of the preceding examples, additionally or optionally, the valve opening overlap area is determined based on a valve lift of the scavenge exhaust valve and a valve lift of the intake valve at a current crank angle, and wherein the operating parameter that is adjusted includes one or more of a timing of the scavenge exhaust valve and a timing of the intake valve. In any or all of the preceding examples, additionally or optionally, to adjust the operating parameter of the engine based on the first value and the second value, the controller includes further computer readable instructions stored on non-transitory memory that, when executed during engine operation, cause the controller to: determine a threshold range around the first value; adjust a cam timing correction responsive to the second value being outside of the threshold range for at least a threshold duration; maintain the cam timing correction responsive to the second value being within the threshold range; and operate one or more the scavenge exhaust valve and the intake valve with the cam timing correction. In any or all of the preceding examples, additionally or optionally, the cam timing correction adjusts one or more of an exhaust cam timing, the exhaust cam timing controlling an opening and closing timing of the scavenge exhaust valve, and an intake cam timing, the intake cam timing controlling an opening and closing timing of the intake valve.

In another representation, a method comprises: adjusting cam timing to adjust an overlap between an intake cam and an exhaust cam according to an adaptive correction term set based on a difference between a first scavenge exhaust gas recirculation (SC-EGR) flow rate and a second SC-EGR flow rate, the first SC-EGR flow rate determined using a first parameter set and the second SC-EGR flow rate time-aligned with the first SC-EGR flow rate and determined using a second, non-overlapping parameter set. In the preceding example, additionally or optionally, the first parameter set includes a valve overlap between an intake valve of a cylinder, the intake valve controlled by the intake cam and coupled to an intake manifold, and a scavenge exhaust valve of the cylinder, the scavenge exhaust valve controlled by the exhaust cam and coupled to a scavenge exhaust manifold. In one or both of the preceding examples, additionally or optionally, the first SC-EGR flow rate and the second SC-EGR flow rate each estimate a gas flow through an EGR passage, the EGR passage coupled between the scavenge exhaust manifold and an engine intake passage. In any or all of the preceding examples, additionally or optionally, the valve overlap is determined based on a valve lift of the intake valve and a valve lift of the scavenge exhaust valve at a current crank angle. In any or all of the preceding examples, additionally or optionally, the first parameter set further includes a pressure of the intake manifold and a pressure of the scavenge manifold, the pressure of the intake manifold and the pressure of the scavenge manifold crank angle-aligned to correspond to the current crank angle. In any or all of the preceding examples, additionally or optionally, the second parameter set includes a pressure difference between the engine intake passage and the EGR passage, the pressure difference crank angle-aligned to correspond to the current crank angle. In any or all of the preceding examples, additionally or optionally, the cam adaptive term is set to decrease the valve overlap between the scavenge exhaust valve and the intake valve responsive to the first SC-EGR flow rate being less than the second SC-EGR flow rate; and the cam adaptive term is set to increase the valve overlap between the scavenge exhaust valve and the intake valve responsive to the first SC-EGR flow rate being greater than the second SC-EGR flow rate. In any or all of the preceding examples, additionally or optionally, the first SC-EGR flow rate being less than the second SC-EGR flow rate includes the first SC-EGR flow rate being at least a threshold amount less than the second SC-EGR flow rate for at least a threshold duration; and the first SC-EGR flow rate being greater than the second SC-EGR flow rate includes the first EGR flow rate being at least the threshold amount greater than the second SC-EGR flow rate for the threshold duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine system comprising:
via a controller,
setting a cam timing correction based on a difference between a first determination and a second determination of an exhaust flow through an exhaust gas recirculation (EGR) passage detected by at least one sensor, the first determination based on a cylinder valve overlap and the second determination independent of the cylinder valve overlap; and
operating at least one of an intake cam and an exhaust cam of the engine system at a corrected timing using the cam timing correction.

2. The method of claim 1, wherein:
scavenging the exhaust flow through the EGR passage, which couples a scavenge exhaust manifold to an intake passage of an engine of the engine system;
coupling the scavenge exhaust manifold to each cylinder of the engine via a scavenge exhaust valve which is controlled via the exhaust cam;
coupling the intake passage to each cylinder via an intake manifold and an intake valve which is controlled via the intake cam; and
determining the cylinder valve overlap which is an opening overlap area between the scavenge exhaust valve and the intake valve.

3. The method of claim 2, wherein coupling each cylinder to an exhaust passage via a blowdown exhaust valve and a blowdown manifold, the blowdown exhaust valve opening and closing earlier in an engine cycle than the scavenge exhaust valve.

4. The method of claim 2, wherein determining the opening overlap area is based on a valve lift of the intake valve and a valve lift of the scavenge exhaust valve at a current crank angle.

5. The method of claim 2, wherein setting the cam timing correction based on the difference between the first determination and the second determination includes:
responsive to the second determination being greater than the first determination, setting the cam timing correction to decrease the opening overlap area between the scavenge exhaust valve and the intake valve; and
responsive to the second determination being less than the first determination, setting the cam timing correction to increase the opening overlap area between the scavenge exhaust valve and the intake valve.

6. The method of claim 5, wherein
setting the second determination being greater than the first determination includes the second determination being at least a threshold amount greater than the first determination for at least a threshold duration, and
setting the second determination being less than the first determination includes the second determination being at least the threshold amount less than the first determination for the threshold duration.

7. The method of claim 5, wherein setting the cam timing correction to decrease the opening overlap area between the scavenge exhaust valve and the intake valve includes at least one of setting the cam timing correction to advance a timing of the exhaust cam and setting the cam timing correction to retard a timing of the intake cam.

8. The method of claim 5, wherein setting the cam timing correction to increase the opening overlap area between the scavenge exhaust valve and the intake valve includes at least one of setting the cam timing correction to retard a timing of the exhaust cam and setting the cam timing correction to advance a timing of the intake cam.

9. The method of claim 1, wherein the first determination is further based on a pressure of the intake manifold and a pressure of the scavenge exhaust manifold, the pressure of the intake manifold and the pressure of the scavenge exhaust manifold crank angle-aligned to correspond to the current crank angle via the at least one sensor.

10. The method of claim 1, wherein the second determination is based on a delta pressure between the intake passage and the EGR passage, the delta pressure crank angle-aligned to correspond to the current crank angle via the at least one sensor.

11. The method of claim 10, wherein determining the delta pressure is based on a difference between a pressure of the EGR passage and a pressure of the intake passage, upstream of a junction of the EGR passage and the intake passage.

12. A method for operating a vehicle including an engine and a controller, comprising:
adjusting, via the controller, a cam adaptive term based on a first flow rate of gases through a scavenge exhaust gas recirculation (SC-EGR) passage to an intake passage of the engine and a second flow rate of the gases, the first flow rate determined based on a valve opening overlap area between scavenge exhaust valves and intake valves coupled to cylinders of the engine, the intake valves coupling the cylinders to an intake manifold and the scavenge exhaust valves coupling the cylinders to the SC-EGR passage via a scavenge manifold, and the second flow rate determined based on a delta pressure between the SC-EGR passage and the intake passage detected by at least one sensor; and
operating, via the controller, at least one of an intake cam and an exhaust cam at a corrected timing based on the cam adaptive term.

13. The method of claim 12, wherein
determining the first flow rate is further based on pressures in each of the intake manifold and the scavenge manifold detected by the at least one sensor, and
adjusting the cam adaptive term based on the first flow rate and the second flow rate includes:
adjusting the cam adaptive term to increase the valve opening overlap area between the scavenge exhaust valves and intake valves responsive to the second flow rate being less than the first flow rate;
adjusting the cam adaptive term to decrease the valve opening overlap area between the scavenge exhaust valves and the intake valves responsive to the second flow rate being greater than the first flow rate; and
maintaining a current cam adaptive term responsive to the second flow rate being equal to the first flow rate.

14. The method of claim 13, wherein setting the second flow rate being greater than the first flow rate includes the second flow rate being at least a threshold amount greater than the first flow rate for a threshold number of time-aligned replicates of the first flow rate and the second flow rate.

15. The method of claim 14, wherein setting the second flow rate being less than the first flow rate includes the second flow rate being at least the threshold amount less than the first flow rate for the threshold number of time-aligned replicates of the first flow rate and the second flow rate.

16. An engine system, comprising:
a plurality of cylinders, each including an intake valve, a scavenge exhaust valve, and a blowdown exhaust valve;
an intake manifold coupled to the intake valve of each cylinder and an intake passage;
a scavenge manifold coupled to the scavenge exhaust valve of each cylinder and the intake passage, upstream of a compressor, via a scavenge exhaust gas recirculation (SC-EGR) passage;
a blowdown manifold coupled to the blowdown exhaust valve of each cylinder and an exhaust passage including a turbine; and
a controller storing computer readable instructions on non-transitory memory that, when executed during engine operation, cause the controller to:
determine a first value of a total flow of gases through the SC-EGR passage based on a valve opening overlap area between the scavenge exhaust valve and the intake valve;
determine a second value of the total flow of gases through the SC-EGR passage based on a delta pressure between the intake passage and the SC-EGR passage detected by at least one sensor, the second value time-aligned with the first value; and
adjust an operating parameter of the engine based on the first value and the second value.

17. The system of claim 16, wherein the first value is further determined based on a measured pressure in the intake manifold and a measured pressure in the scavenge manifold via the at least one sensor.

18. The system of claim 16, wherein the valve opening overlap area is determined based on a valve lift of the scavenge exhaust valve and a valve lift of the intake valve at a current crank angle, and wherein the operating parameter that is adjusted includes at least one of a timing of the scavenge exhaust valve and a timing of the intake valve.

19. The system of claim 16, wherein, to adjust the operating parameter of the engine based on the first value and the second value, the controller includes further computer readable instructions stored on non-transitory memory that, when executed during engine operation, cause the controller to:
  determine a threshold range centered at the first value;
  adjust a cam timing correction responsive to the second value being outside of the threshold range for at least a threshold duration;
  maintain the cam timing correction responsive to the second value being within the threshold range; and
  operate at least one of the scavenge exhaust valve and the intake valve with the cam timing correction.

20. The system of claim 19, wherein the cam timing correction adjusts the at least one of an exhaust cam timing to control an opening and closing timing of the scavenge exhaust valve, and an intake cam timing to control an opening and closing timing of the intake valve.

* * * * *